(12) United States Patent
Salles et al.

(10) Patent No.: US 11,538,343 B2
(45) Date of Patent: Dec. 27, 2022

(54) AUTOMATIC WARNING OF ATYPICAL AUDIO INDICATING A TRANSPORT EVENT

(71) Applicant: TOYOTA MOTOR NORTH AMERICA, INC., Plano, TX (US)

(72) Inventors: Felipe G. Salles, Garland, TX (US); Shintaro Iwaasa, Frisco, TX (US); Louis Brugman, Frisco, TX (US); Devang H. Parekh, Dallas, TX (US); Robert D. Slater, Murphy, TX (US); Christopher J. Risberg, Flower Mound, TX (US); Nutonya L. Parker, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 337 days.

(21) Appl. No.: 16/827,661

(22) Filed: Mar. 23, 2020

(65) Prior Publication Data

US 2021/0295700 A1    Sep. 23, 2021

(51) Int. Cl.
| | |
|---|---|
| *G08G 1/00* | (2006.01) |
| *G08G 1/16* | (2006.01) |
| *G06F 9/54* | (2006.01) |
| *H04W 4/46* | (2018.01) |
| *H04L 9/06* | (2006.01) |
| *H04W 4/029* | (2018.01) |
| *H04L 9/00* | (2022.01) |

(52) U.S. Cl.
CPC ............ *G08G 1/163* (2013.01); *G06F 9/542* (2013.01); *H04L 9/0643* (2013.01); *H04W 4/029* (2018.02); *H04W 4/46* (2018.02); *H04L 9/50* (2022.05)

(58) Field of Classification Search
CPC ........ G08G 1/163; H04W 4/46; H04W 4/029; G06F 9/542; H04L 9/0643; H04L 9/50
See application file for complete search history.

(56) References Cited

U.S. PATENT DOCUMENTS

| | | |
|---|---|---|
| 7,202,776 B2 | 4/2007 | Breed |
| 7,348,895 B2 | 3/2008 | Lagassey |
| 7,527,288 B2 | 5/2009 | Breed |
| 7,840,355 B2 | 11/2010 | Breed et al. |
| 7,899,621 B2 | 3/2011 | Breed et al. |
| 8,024,084 B2 | 9/2011 | Breed |
| 8,050,863 B2 | 11/2011 | Trepagnier et al. |
| 9,805,601 B1 | 10/2017 | Fields et al. |
| 10,096,038 B2 | 10/2018 | Ramirez et al. |

(Continued)

FOREIGN PATENT DOCUMENTS

| | | |
|---|---|---|
| AU | 2006304838 B2 | 7/2011 |
| CN | 201380816 | 1/2010 |

(Continued)

*Primary Examiner* — Samina F Choudhry

(57) ABSTRACT

An example operation includes one or more of receiving, via a transport, a transport audio, classifying, via the transport, a subset of the transport audio as an atypical transport audio, determining, via the transport, a possible source location of the atypical transport audio, transmitting, via the transport, the atypical transport audio and the possible source location to a server, determining, via the server, a set of potential causes of the atypical transport audio and receiving, via the transport, the set of potential causes of the atypical transport audio.

8 Claims, 23 Drawing Sheets

(56) References Cited

U.S. PATENT DOCUMENTS

| | | |
|---|---|---|
| 10,479,274 B2 | 11/2019 | Park |
| 10,527,440 B2 | 1/2020 | Yalla |
| 10,733,673 B1 | 8/2020 | Slusar |
| 10,861,326 B2 | 12/2020 | Chun et al. |
| 11,030,904 B2 | 6/2021 | Tang et al. |
| 11,062,341 B2 | 7/2021 | Ramirez et al. |
| 2005/0207585 A1 | 9/2005 | Christoph |
| 2007/0005609 A1 | 1/2007 | Breed |
| 2007/0021915 A1 | 1/2007 | Breed et al. |
| 2007/0109111 A1 | 5/2007 | Breed et al. |
| 2007/0152804 A1 | 7/2007 | Breed et al. |
| 2009/0088916 A1 | 4/2009 | Elgersma et al. |
| 2010/0207787 A1 | 8/2010 | Catten et al. |
| 2012/0083947 A1 | 4/2012 | Anderson et al. |
| 2013/0325323 A1* | 12/2013 | Breed ............... G01C 21/3667 701/420 |
| 2015/0168174 A1* | 6/2015 | Abramson ......... G01C 21/3407 701/408 |
| 2016/0086285 A1 | 3/2016 | Peters et al. |
| 2016/0171521 A1 | 6/2016 | Ramirez et al. |
| 2016/0357262 A1 | 12/2016 | Ansari |
| 2017/0101056 A1 | 4/2017 | Park |
| 2017/0234689 A1 | 8/2017 | Gibson et al. |
| 2018/0164107 A1 | 6/2018 | Yalla |
| 2018/0218606 A1 | 8/2018 | Michalakis |
| 2018/0374113 A1 | 12/2018 | Ramirez et al. |
| 2019/0012908 A1 | 1/2019 | Chun et al. |
| 2019/0378150 A1 | 12/2019 | Patsiokas et al. |
| 2020/0143300 A1* | 5/2020 | Weldemariam ..... G06F 16/1805 |
| 2020/0168099 A1 | 5/2020 | Yamaguchi et al. |
| 2020/0286310 A1 | 9/2020 | Carver et al. |
| 2021/0039715 A1 | 2/2021 | Ferrer et al. |
| 2021/0295700 A1 | 9/2021 | Salles et al. |

FOREIGN PATENT DOCUMENTS

| | | | | |
|---|---|---|---|---|
| CN | 1906473 B | | 9/2011 | |
| CN | 102328593 A | | 1/2012 | |
| CN | 103335658 A | | 10/2013 | |
| CN | 106157614 A | * | 11/2016 | ............. G07C 5/085 |
| CN | 106596123 B | * | 3/2020 | .......... G01M 17/007 |
| DE | 10393592 C | | 11/2005 | |
| DE | 102006054603 A1 | | 5/2008 | |
| EP | 1229475 B1 | | 10/2007 | |
| EP | 1502093 B1 | | 7/2011 | |
| FR | 3100203 A1 | | 3/2021 | |
| JP | 3662581 B2 | | 6/2005 | |
| JP | 2007058713 A | | 3/2007 | |
| JP | 1196497 B2 | | 12/2008 | |
| JP | 1239374 B2 | | 3/2009 | |
| JP | 1706890 B2 | | 6/2011 | |
| KR | 20100035516 A | | 4/2010 | |
| KR | 101736977 B1 | | 5/2017 | |

* cited by examiner

190

195

AUTOMATIC WARNING OF ATYPICAL AUDIO INDICATING A TRANSPORT EVENT

TECHNICAL FIELD

This application generally relates to vehicle safety systems, and more particularly, to the automatic warning of atypical audio indicating a transport event.

BACKGROUND

Vehicles or transports, such as cars, motorcycles, trucks, planes, trains, etc., generally provide transportation needs to occupants and/or goods in a variety of ways. Actions of the vehicle may be sensed via multiple sensors and functions related to transports may be communicated by various computing devices, such as a smartphone or a computer.

Currently, transports are an island unto themselves with regard to hazard mitigation. The transport senses the danger and takes appropriate action based on the input from that transport's sensors.

The use of information from other vehicles or from external sources such as servers may serve to increase situational and operational awareness of the individual transport to allow it to benefit from the data generated by other vehicles or from external information sources provided by the server. This increase in situational and operational awareness may provide a means to reduce the impact of a dangerous situation or event on the transport.

SUMMARY

One example embodiment provides a method, comprising one or more of, determining, via a server, a dangerous area on a route of a transport, wherein the dangerous area is based on a new condition of an area, sending a notification to the transport, via the server, of the dangerous area and the new condition and performing, via the transport, at least one atypical action to traverse the dangerous area until a resolution of the new condition occurs, wherein the atypical action comprises one or more movements that do not typically occur on or around the dangerous area.

Another example embodiment provides a system, comprising one or more of, a position system operatively coupled to a transport that determines a route of the transport, a server that determines an approach of the transport to a dangerous area on the route of the transport, wherein the dangerous area is based on a new condition of an area, a transceiver operatively coupled to the transport that sends via the server a notification to the transport of the dangerous area and the new condition and a processor operatively coupled to the transport that causes the transport to perform at least one atypical action to traverse the dangerous area until a resolution of the new condition occurs, wherein the atypical action comprises one or more movements that do not typically occur on or around the dangerous area.

A further example embodiment provides a non-transitory computer readable medium comprising instructions, that when read by a processor, cause the processor to perform one or more of, determining, via a server, a dangerous area on a route of a transport, wherein the dangerous area is based on a new condition of an area, sending a notification to the transport, via the server, of the dangerous area and the new condition and performing, via the transport, at least one atypical action to traverse the dangerous area until a resolution of the new condition occurs, wherein the atypical action comprises one or more movements that do not typically occur on or around the dangerous area.

Another example embodiment provides a method, comprising one or more of receiving, via a transport, a transport audio, classifying, via the transport, a subset of the transport audio as an atypical transport audio, determining, via the transport, a possible source location of the atypical transport audio, transmitting, via the transport, the atypical transport audio and the possible source location to a server, determining, via the server, a set of potential causes of the atypical transport audio and receiving, via the transport, the set of potential causes of the atypical transport audio A further example embodiment provides a system, comprising one or more of a microphone array operatively coupled to a transport that receives a transport audio, an audio classifier operatively coupled to the transport that discriminates atypical transport audio from typical transport audio, an audio beamformer operatively coupled to the transport that estimates a possible source location of the atypical transport audio, a transceiver operatively coupled to the transport that transmits the atypical transport audio and the possible source location to a server, a server that determines a set of potential causes of the atypical transport audio and transmits the set of potential causes of the atypical audio to the transport and a processor operatively coupled to the transport that receives the set of potential causes of the atypical transport audio Another example embodiment provides a non-transitory computer readable medium comprising instructions, that when read by a processor, cause the processor to perform one or more of receiving, via a transport, a transport audio, classifying, via the transport, a subset of the transport audio as an atypical transport audio, determining, via the transport, a possible source location of the atypical transport audio, transmitting, via the transport, the atypical transport audio and the possible source location to a server, determining, via the server, a set of potential causes of the atypical transport audio and receiving, via the transport, the set of potential causes of the atypical transport audio.

DETAILED DESCRIPTION

Figure 1A:
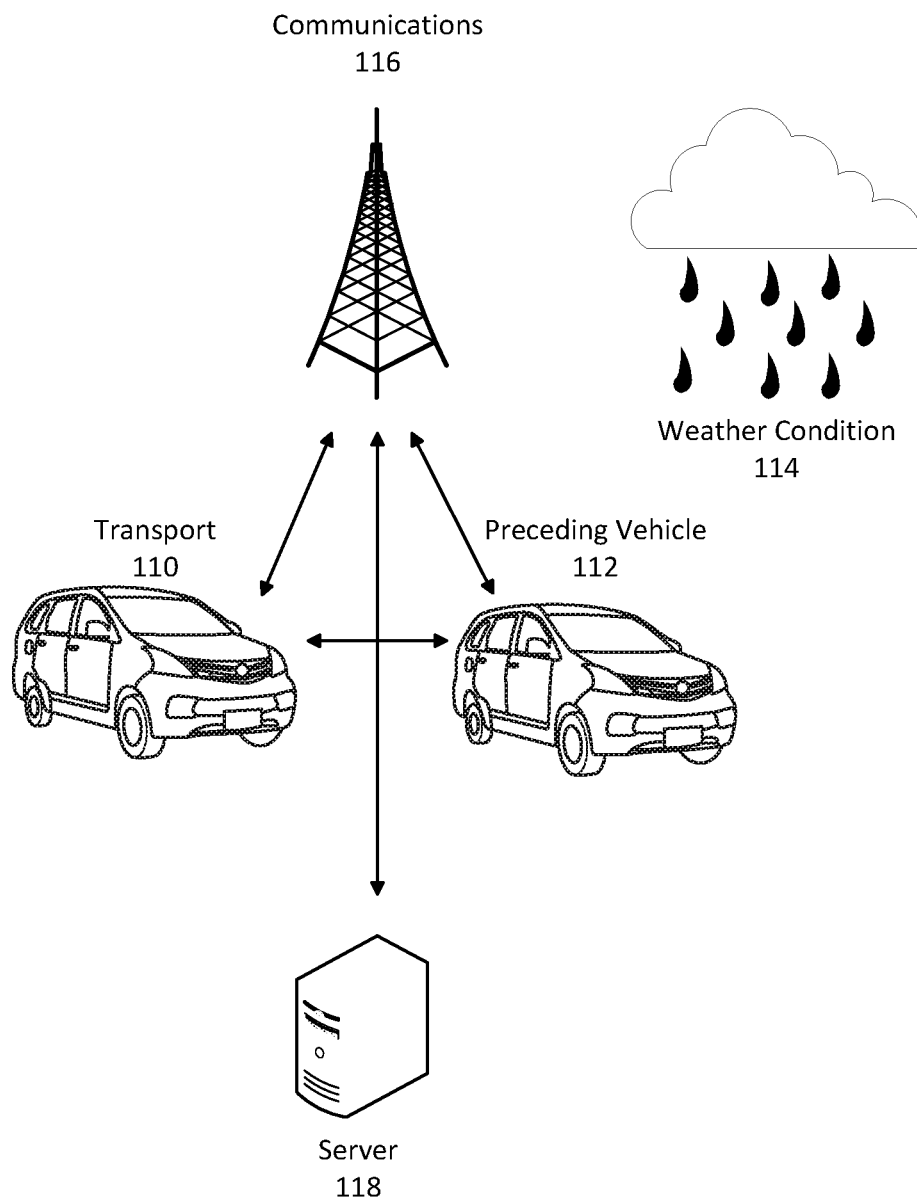
FIG. 1A illustrates a first example automatic warning system overview, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of vehicles, cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein) a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system which can secure interactions among a group of entities which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group. Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, light detection and ranging (LIDAR) projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, global position system (GPS), maps and other cameras and sensors are used in an autonomous vehicles without lidar as lidar is often viewed as being expensive and unnecessary. Researchers have determined that stereo cameras are a low-cost alternative to the more expensive lidar functionality.

Data shared and received may be stored in a database which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

Using sensors, road conditions, and other data, it is possible to notify a driver and/or an autonomous transport of situations that may become dangerous on a current route. As the system performs detection and analysis, no human intervention is needed in the determination of the danger and the notification.

The automatic warning of navigating an approach to a dangerous area and/or event allows for a transport to notify occupants or a central controller, if the transport is autonomous, of a potentially dangerous area and/or on or near the current route of the transport. For example, a dangerous area may be determined by the system to be an area that statistically has had many accidents, where one or more transports have been acting erratically on the current route, that may be affected by the weather, and the like. A dangerous event may be determined by the system to be an accident, an object in the road, unusual traffic, and the like.

In another embodiment, the transport receives a warning notification from other transports such as via vehicle-to-vehicle communication when sensors on other transports detect that the transport is being operated erratically, or in a dangerous manner. The notification may suggest, "Please move to the right when able for safety purposes", or "It is recommended to take the next exit for safety reasons". In an autonomous setting, the transport may directly take these types of actions, and/or via assistance from a human operator.

Dangerous areas broadly fall into one of two categories, static and moving. A static dangerous area would be an oily patch on the road, a moving dangerous area may be fog, rain, sleet, flooding, hail, thunderstorms, tornados and the like.

FIG. 1A illustrates one embodiment of the present disclosure that provides a warning system 100 in an autonomous transport 110 via a preceding vehicle 112, wherein the preceding vehicle is driving in an erratic manner due to a new condition 114 such as weather conditions (as well as road conditions, transport conditions, driver conditions, etc. not shown). The preceding vehicle 112 communicates via wireless communications 116 with a server 118 and/or transport 110 (for example via vehicle-to-vehicle communication) to inform them of the driving responses of preceding vehicle 112. The wireless communications may be Bluetooth, cellular, Wi-Fi, 802.11p, LTE-V2V, and the like. The weather condition(s) may be fog, rain, sleet, flooding, hail, thunderstorms, tornados, snow, ice, hurricane, and the like. The weather condition(s) are sensed by one or more of the transport, the preceding vehicle or may be received by the server (via the preceding vehicle and/or other vehicles) determining the effect of new rainfall at the area. In an alternate embodiment, the server may also receive information from other servers with knowledge regarding the weather condition(s). In this example, the transport and/or vehicles are autonomous and acting in part under the direction of the server. Other examples include a driver-assisted transport in which both the vehicle and the driver are assessed of the weather condition.

In an example in which a driver-assisted and/or an autonomous system is utilized, the driver(s) and for the autonomous transport(s) would be instructed to perform at least one atypical action such as intermittently stopping, slowing and/or speeding up of the transport, to insure driver control of the transport on a dangerous area on a route of the transport. In this situation, the driver would be actively informed by the vehicle (via a sensor and/or processor) to perform the atypical action.

The dangerous condition(s) and/or the dangerous area(s) of preceding vehicle 112 may be a result of erratic driving due to the weather as discussed previously, obstacles, road conditions, visibility conditions and the like. The erratic driving conditions observed may include swerving, excessive braking, tire slippage and the like. In one embodiment the system provides the vehicle and/or driver with advanced notice of driving condition changes to allow the vehicle and/or the driver increased situational awareness.

The transport may transmit information regarding the dangerous area. The new condition (that forms the basis of the dangerous area) may be detected by one or more preceding vehicles traveling through the dangerous area that transmit information related to the new condition to the server and/or other transports behind the preceding vehicles and/or ahead of the preceding vehicles heading toward the dangerous area. The notification may be provided via at least one of an audible signal to a driver, a visual signal to the driver and an electrical signal to the transport. In one embodiment, the visual signal may be a video and/or an image of the dangerous area that is provided in a display of the transport prior to traversing the dangerous area. Further, information visually provided on the video and/or the image can be augmented by audible and/or textual information, which indicates a specific atypical action(s) to take at a specific portion(s) of the dangerous area. For example, highlighting the specific area(s) and describing the atypical action(s) to take at each of the highlighted areas such as slowing at area 1, turning at area 2, stopping at area 3, etc. As the new condition that made the area dangerous begins to subside (for example, the road begins to become less slick, the video and/or the image is updated accordingly.) For example, the recommendation to turn at area 2 may be removed if the reason for turning at area 2 has been alleviated/improved. This updated information is provided to transports approaching the dangerous but improving area. The resolution may be based on a non-detection of the new condition by one or more current vehicles traveling through the dangerous area, wherein the one or more current vehicles transmit information related to the non-detection of the new condition to the server and/or an elapsed time from a beginning of the new condition.

Figure 1B:
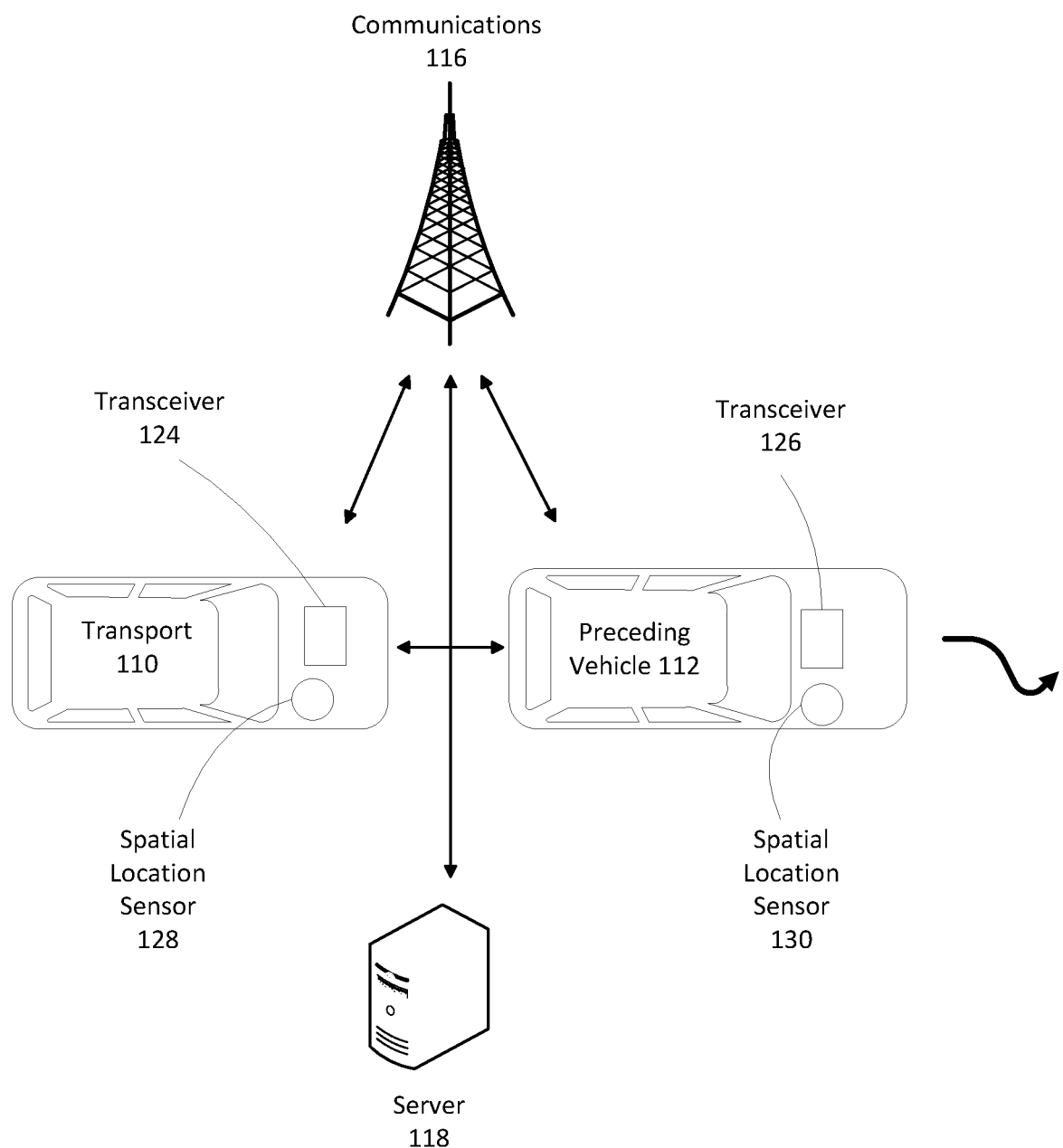
FIG. 1B illustrates a second example automatic warning system overview, according to example embodiments.

FIG. 1B illustrates one embodiment of the present disclosure in which the system 120 includes a Spatial Location Sensor (or a Position Location System/Sensor) 128 (FIG. 1B) operatively coupled to a transport 110 (see also FIG. 1D) that determines a route 176 (see FIG. 1D) of the transport. A server 118 (FIG. 1B) determines an approach of the transport to a dangerous area 172" (FIG. 1E) on the route of the transport, wherein the dangerous area is based on a new condition 114" (FIG. 1E) of an area. A transceiver 124 (FIG. 1B) that is operatively coupled to the transport transmits via the server a notification to the transport of the dangerous area 172" (FIG. 1E) and the new condition 114" (FIG. 1E). A processor operatively coupled to the transport causes the transport 110 (FIG. 1D) to perform at least one atypical action to traverse the dangerous area 172" (FIG. 1E) until a resolution of the new condition occurs. The atypical action includes one or more movements that do not typically occur on or around the area when it is not considered dangerous. In another embodiment, the transport 110 may act independently of the server 118 and determine (via on-board sensors, processors, and the like) the approach of the transport to the dangerous area as well as sending a notification to other transports of the dangerous area and the new condition.

The embodiment of FIG. 1B may additionally include communications system 116 provided via the preceding vehicle 112 having a Spatial Location Sensor (or a Position Location System/Sensor) 130, and a transceiver 126 to communicate, i.e. transmit and receive, with the server 118 via the communications system 116 or may communicate directly with the transport 110. The position location sensor may be a GPS, a camera, a LIDAR, radar, sonar, and the like. The preceding vehicle (as well as the transport 110) may have accelerometers, gyroscopes, traction sensors, temperature sensors, proximity sensors, pressure sensors, and the like.

The driving data from the preceding vehicle 112 and the transport 110 is sent to the server 118 where the driving data is stored in a database, such as a blockchain which may be resident on the server or off the server (not depicted). The preceding vehicle 112 may be monitored via one or more sensors that report sensed data to a central controller computer device (not depicted), which in turn, is forwarded to a blockchain and/or a management server for review and action. Additionally, the blockchain may be in a server outside of the transport or the preceding vehicle, or, each of the transports/vehicles may be a node in the blockchain, that are connected in a blockchain network.

Figure 1C:
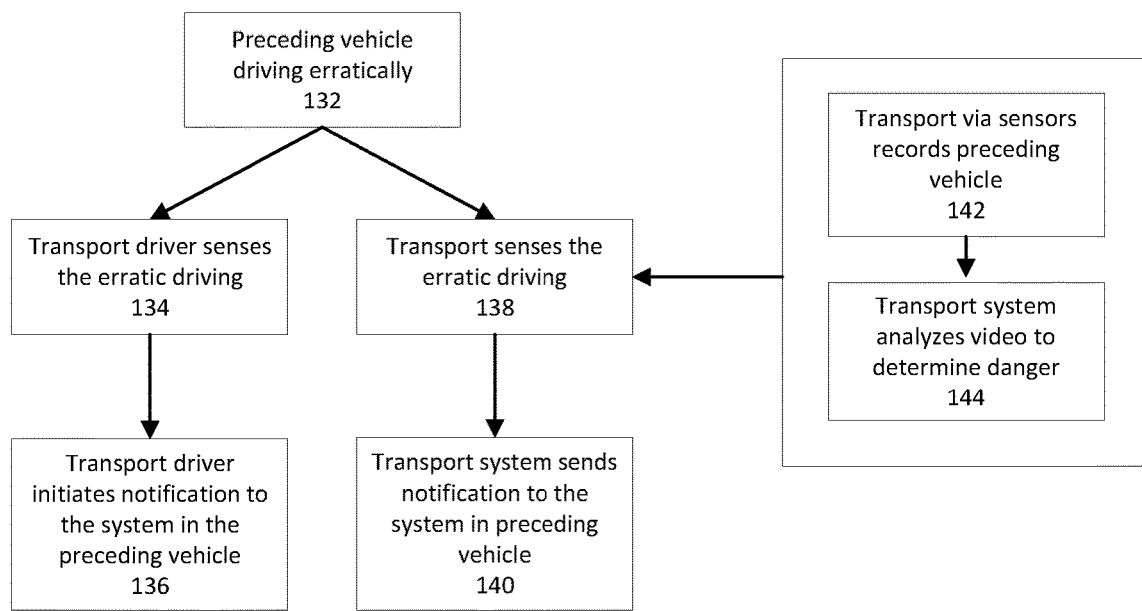
FIG. 1C illustrates an example an example logic flow of the automatic warning method, according to example embodiments.

FIG. 1C depicts an example logic flow in which a notification(s) can be sent to the preceding vehicle 112 using a nearby transport when the preceding vehicle is being operated erratically or otherwise maneuvering dangerously. In a first embodiment, an occupant of the preceding vehicle may interact with the system wherein the occupant may instruct the system to send a notification to the transport following behind. In another embodiment, sensors on the transport may be utilized to capture data including one or more of video, image, audio, radar, light detection and ranging (LIDAR), tire slippage sensor, etc. that the system analyzes to determine the danger. The system automatically sends a notification to the preceding vehicle, wherein the occupants of vehicle or the preceding vehicle itself, may become aware that other transports have a concern.

In the embodiment of FIG. 1C, the preceding vehicle is detected 132 as driving erratically, in one instance the transport driver senses 134 the erratic driving and initiates 136 a notification to the system in the previous transport to inform the system of the erratic driving. In another instance, the transport senses 138 the erratic driving and sends 140 notifications to the system in the preceding vehicle informing it of the detection of erratic driving. In this instance, the transport sensors record 142 the erratic driving of the preceding vehicle and the transport analyzes 144 the video to determine danger.

Figure 1D:
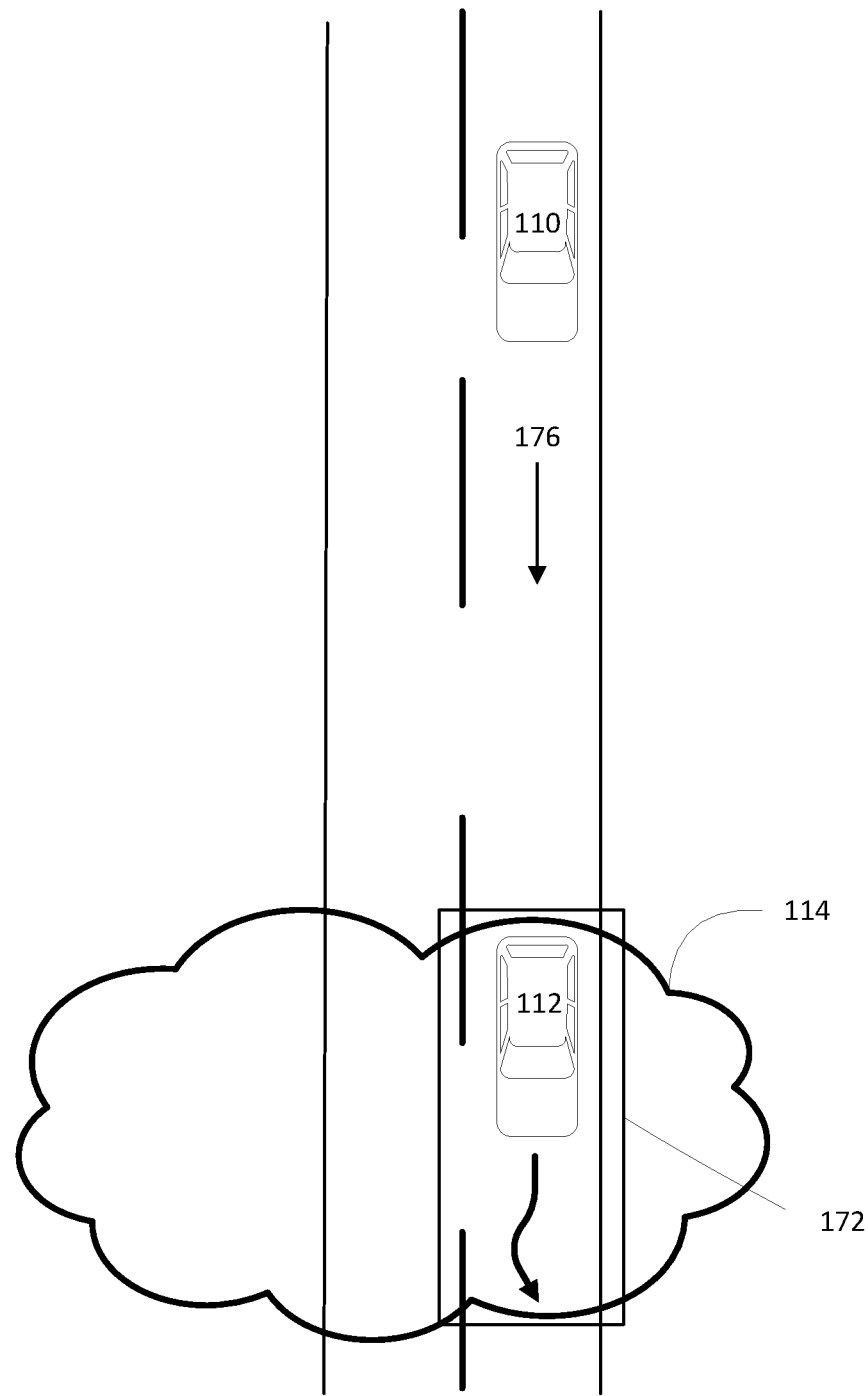
FIG. 1D illustrates an automatic warning system providing a warning to a transport, according to example embodiments.
Figure 1E:
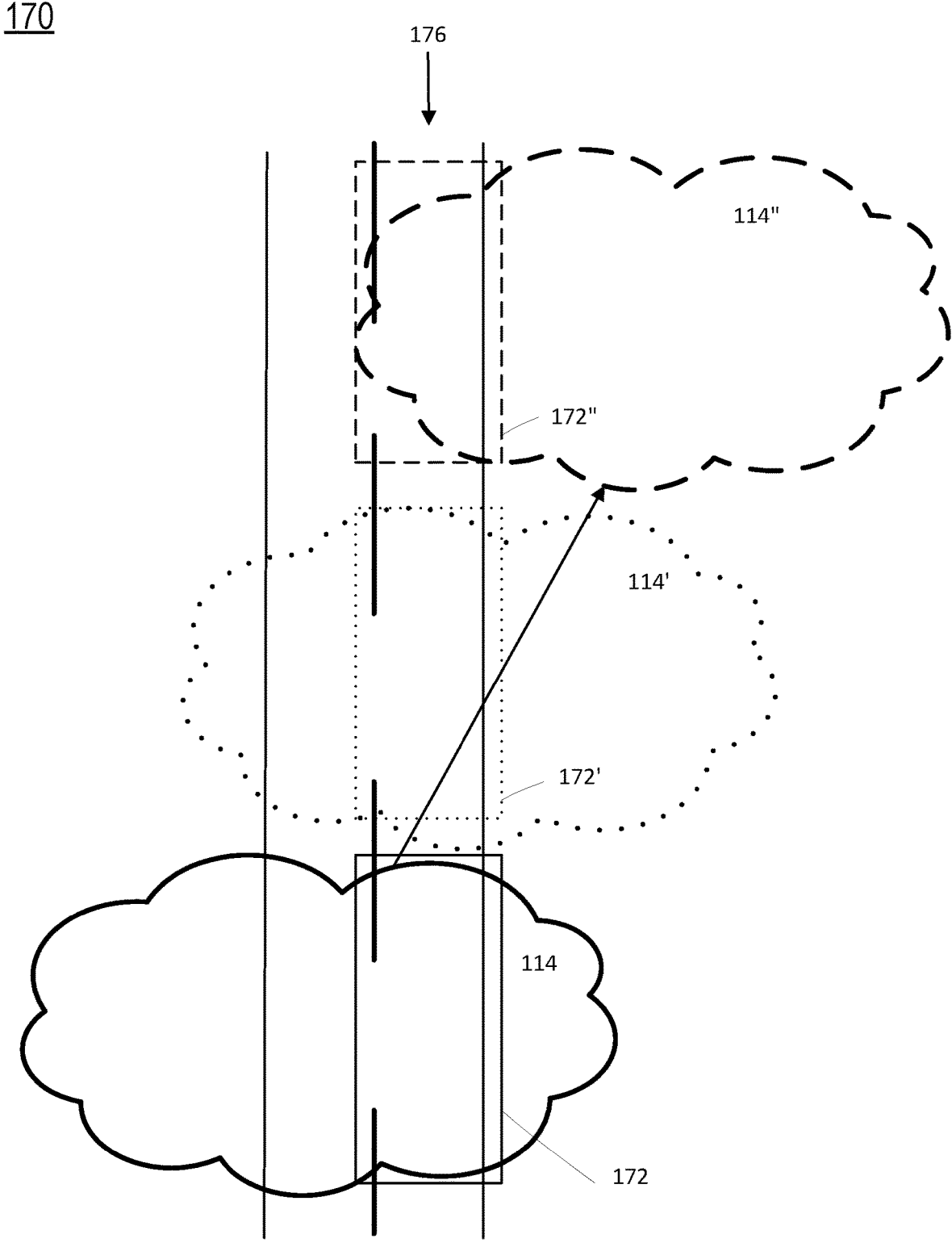
FIG. 1E illustrates a weather system moving over time and its effect on the dangerous area, according to example embodiments.

The example of FIG. 1D shows the transiting of the transport 110 that is following a preceding vehicle 112. In this example, a rainstorm is currently affecting the preceding vehicle 112 and will shortly have an effect on transport 110.

FIG. 1D depicts an example system 160 having a Spatial Location Sensor (or a Position Location System/Sensor) 130 (FIG. 1B) operatively coupled to a preceding vehicle 112 (FIG. 1D) that determines a route 176 (FIG. 1D) of the preceding vehicle. A server 118 (FIG. 1B) is in communication with the preceding vehicle 112 (FIG. 1D) via transceiver 126 (FIG. 1D) that transmits and receives data. In the case in which the server 118 (FIG. 1B) is unaware of the existence of the dangerous area, the sensors on board the preceding vehicle 112 (FIG. 1D) inform server 118 (FIG. 1B) via transceiver 126 (FIG. 1D) that it is experiencing dangerous road conditions. In this example, a Spatial Location Sensor (or a Position Location System/Sensor) 128 (FIG. 1B) operatively coupled to a transport 110 (FIG. 1D) that determines that transport 110 (FIG. 1D) is following the route 176 (FIG. 1D) of the preceding vehicle 112 (FIG. 1D) and is approaching the dangerous area 172 (FIG. 1D). A transceiver 124 (FIG. 1B) is operatively coupled to the transport 110 (FIG. 1B) and receives via the server 118 (FIG. 1B) a notification of the dangerous area 172 (FIG. 1D) and the new condition 114 (FIG. 1D). A processor is operatively coupled to the transport and causes the transport 110 (FIG. 1D) to perform at least one atypical action to traverse the dangerous area 172 (FIG. 1D) until a resolution of the new condition 114 (FIG. 1D) occurs. The atypical action comprises one or more movements that do not typically occur on or around the dangerous area 172 (FIG. 1D).

In another example, a system having a Spatial Location Sensor (or a Position Location System/Sensor) 130 (FIG. 1B) operatively coupled to a preceding vehicle 112 (FIG. 1D) that determines a route 176 (FIG. 1D) of the preceding vehicle. A server 118 (FIG. 1B) is in communication with the preceding vehicle 112 (FIG. 1D) via transceiver 126 (FIG. 1D) that transmits and receives data. In this example the server 118 (FIG. 1B) is aware of the existence of a dangerous area 172 (FIG. 1D) before the preceding vehicle arrives at the dangerous area via access to extra-vehicular information such data from another server having access to weather radar. In the case, notification is sent to the preceding vehicle 112 via transceiver 126 (FIG. 1D). Transport 110 (FIG. 1D) receives a notification directly from preceding vehicle 112 (FIG. 1D), notifying transport 110 (FIG. 1D) of dangerous area 172 (FIG. 1D). This vehicle-to-vehicle notification may occur via transceiver 126 (FIG. 1B) on the preceding vehicle 112 (FIG. 1B) directly to transceiver 124 (FIG. 1B) on transport 110 (FIG. 1B).

FIG. 1E depicts a moving dangerous area caused by a moving weather condition. In this example system 170, a rainstorm is moving across the route 176. The new condition 114 is a time-elapsed weather event 114, 114' and 114" overlaps the route 176 creating time-elapsed dangerous areas 172, 172' and 172" moving with time. The amount of time the weather condition resides on the route determines in part the effect that the weather condition has on the route and is utilized to assess a moving dangerous area. In one example, rainfall over an area may create a flooding condition over a time period at the dangerous area that increases the threat level of the dangerous area. The accumulation of water may terminate when the storm system moves away from the route, however the dispersal of the accumulated rain from the route during a draining period. During this draining period, although there is no new condition 114 on the route as the weather event has moved, the dangerous area 172 remains. The new condition may be a weather condition such as fog, rain, sleet, flooding, hail, thunderstorms, tornados, snow, ice, hurricane, and the like that is moving over time and transiting over the route. The type of weather condition impacts the dispersal time of the threat level of the dangerous area.

The dangerous area may also be static. In one example an oil slick is a static type of dangerous area, rain would make the oil slick particularly non-adhesive to tire tread. A typical action would be to slow the transport along the oil slick area. An atypical action would be to move a bit, stop, move a bit and stop until the area is traversed. A traction sensor in a preceding vehicle would inform the server as to the locations of the oil slick and its severity so that subsequent transports could utilize this information to increase the safety of the transit of the dangerous area.

In this disclosure the term 'via' may mean directly by an object such as the sensor, camera, etc. or indirectly by an object such as through a server, storage, or other device.

Figure 1F:
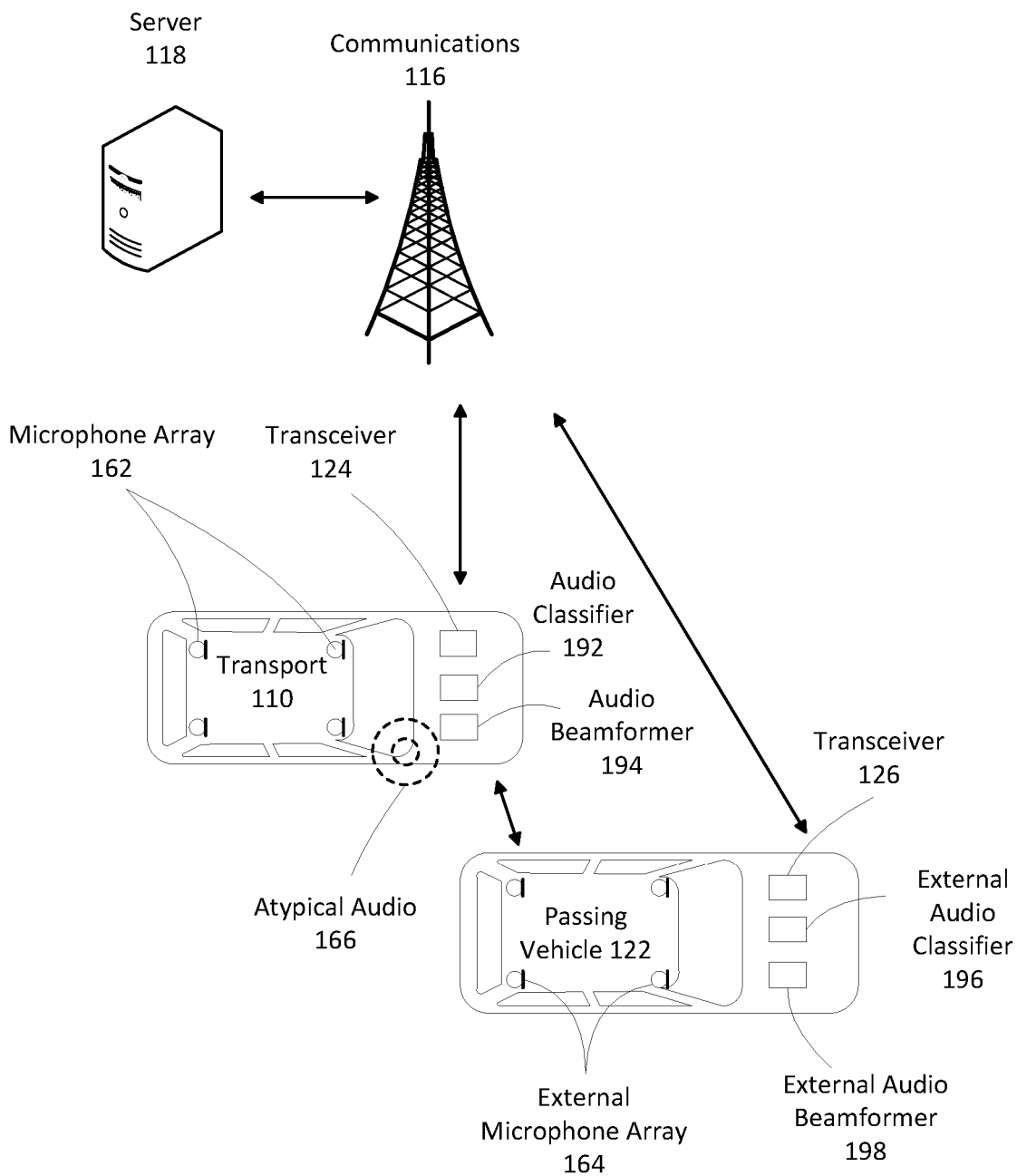
FIG. 1F illustrates an atypical noise warning system utilizing a transport and a passing vehicle to provide a warning to the transport, according to example embodiments.
Figure 1G:
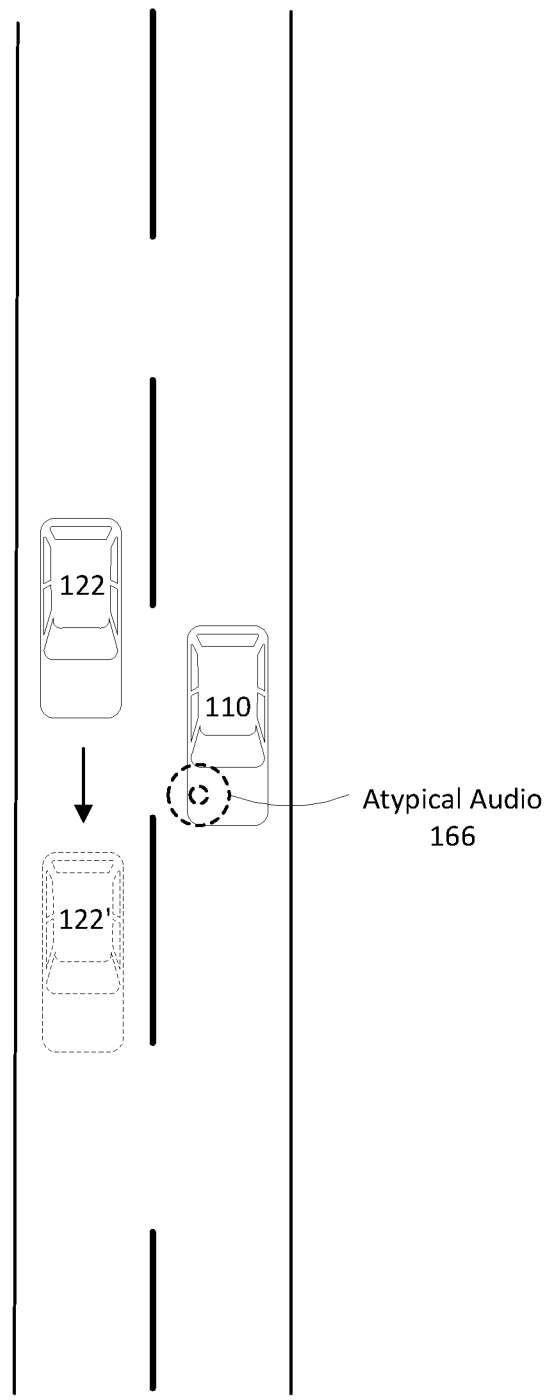
FIG. 1G illustrates an overview of an atypical noise warning system utilizing a transport and a passing vehicle to provide a warning to the transport, according to example embodiments.
Figure 1H:
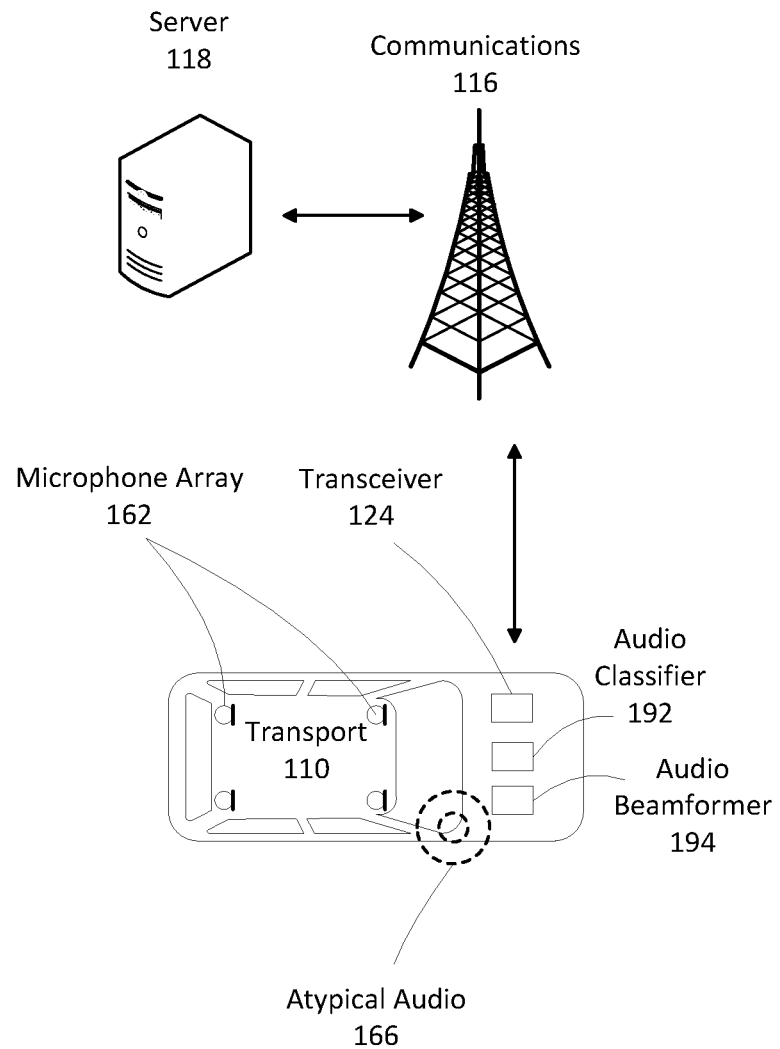
FIG. 1H illustrates an atypical noise warning system utilizing one transport to provide a warning, according to example embodiments.

FIGS. 1F, 1G and 1H depict a general system for atypical audio detection and potential cause identification. There are at least four embodiments of this system, FIG. 1H depicts a system in which the vehicle detects the atypical sound itself and has a server determine the set of potential causes and a system in which the vehicle identifies the atypical sound and self-diagnoses the potential set of problems. FIGS. 1F and 1G depict a system in which both the transport and a passing vehicle identify the atypical sound and the server identifies the potential set of causes and a system in which both the transport and a passing vehicle identify the atypical sound and the transport self-diagnoses the potential set of causes.

The system has a transport 110 (FIGS. 1H, 1F and 1G) and may include a passing vehicle 122, 122' (FIGS. 1F and 1G). The transport 110 (FIG. 1F, 1H) has a microphone array 162 (FIG. 1F, 1H), a transceiver 124 (FIG. 1F, 1H), an audio classifier 192 (FIG. 1F, 1H) and an audio beamformer 194 (FIG. 1F, 1H). The transport 110 (FIG. 1F, 1H) emits an atypical transport audio 166 (FIG. 1F, 1H), that may indicate some type of issue or problem with the vehicle.

The passing vehicle 122, 122' (FIGS. 1F and 1G) has an external microphone array 164 (FIG. 1F), a transceiver 126 (FIG. 1F), an external audio classifier 196 (FIG. 1F) and an external audio beamformer 198 (FIG. 1F). As the passing vehicle 122, 122' (FIG. 1G) passes the transport 110 (FIG. 1G) it detects an external atypical audio signal, that may be transmitted to either the transport 110 (FIG. 1G) or the server 118 (FIG. 1F) via vehicle-to-vehicle data transfer or communications 116 (FIG. 1F) respectively.

In a first embodiment, a system of self-audio identification and server diagnosis, a microphone array 162 (FIG. 1H) is operatively coupled to a transport 110 (FIG. 1H) that receives transport audio, an audio classifier 192 (FIG. 1H) is operatively coupled to the transport 110 (FIG. 1H) that discriminates atypical transport audio 166 (FIG. 1H) from typical transport audio and an audio beamformer 194 (FIG. 1H) is operatively coupled to the transport 110 (FIG. 1H) that estimates a source location of the atypical transport audio 166 (FIG. 1H). A transceiver 124 (FIG. 1H) is operatively coupled to the transport 110 (FIG. 1H) that transmits the atypical transport audio 166 (FIG. 1H) and the possible source location to a server 118 (FIG. 1H), a server 118 (FIG. 1H) that determines a set of potential causes of the atypical transport audio 166 (FIG. 1H) and transmits the set of potential causes of the atypical audio 166 (FIG. 1H) to the transport 110 (FIG. 1H) and a processor is operatively coupled to the transport 110 (FIG. 1H) that receives the set of potential causes of the atypical transport audio 166 (FIG. 1H).

In a second embodiment, a system of self-audio identification and self-diagnosis, a microphone array 162 (FIG. 1H) is operatively coupled to a transport 110 (FIG. 1H) that receives transport audio, an audio classifier 192 (FIG. 1H) is operatively coupled to the transport 110 (FIG. 1H) that discriminates atypical transport audio from typical transport audio and an audio beamformer 194 (FIG. 1H) operatively coupled to the transport 110 (FIG. 1H) that estimates a source location of the atypical transport audio 166 (FIG. 1H). A transceiver 124 (FIG. 1H) is operatively coupled to the transport 110 (FIG. 1H) that transmits the atypical transport audio 166 (FIG. 1H) and the possible source location to a server 118 (FIG. 1H), a processor is operatively coupled to the transport 110 (FIG. 1H) that determines a set of potential causes of the atypical transport audio 166 (FIG. 1H) and transmits the set of potential causes of the atypical audio 166 (FIG. 1H) to the server 118 (FIG. 1H).

In a third embodiment, a system of self and external audio identification and server diagnosis, a microphone array 162 (FIG. 1F) is operatively coupled to a transport 110 (FIG. 1F) receives transport audio, an audio classifier 192 (FIG. 1F) is operatively coupled to the transport 110 (FIG. 1F) that discriminates atypical transport audio from typical transport audio and an audio beamformer 194 (FIG. 1F) operatively coupled to the transport 110 (FIG. 1F) that estimates a source location of the atypical transport audio 166 (FIG. 1F). An external microphone array 164 (FIG. 1F) is operatively coupled to a passing vehicle 122 (FIG. 1F) that receives an external atypical transport audio of the transport, an external audio beamformer 198 (FIG. 1F) is operatively coupled to the passing vehicle 122 (FIG. 1F) that estimates an external source location of the external atypical transport audio of the transport 110 (FIG. 1F) and a transceiver 124 (FIG. 1F) is operatively coupled to the transport 110 (FIG. 1F) that receives the external atypical transport audio and the external source location from the passing vehicle 122 (FIG. 1F) and transmits the atypical transport audio 166 (FIG. 1F), the possible source location, the external atypical transport audio and the external source location to a server 118 (FIG. 1F). A processor is operatively coupled to the transport 110 (FIG. 1F) that receives a set of potential causes of the atypical transport audio 166 (FIG. 1F) from the server 118 (FIG. 1F).

In a fourth embodiment, a system of self and external audio identification and self-diagnosis, a microphone array 162 (FIG. 1F) is operatively coupled to a transport 110 (FIG. 1F) that receives transport audio, an audio classifier 192 (FIG. 1F) is operatively coupled to the transport 110 (FIG. 1F) that discriminates atypical transport audio from typical transport audio and an audio beamformer 194 (FIG. 1F) is operatively coupled to the transport 110 (FIG. 1F) that estimates a source location of the atypical transport audio 166 (FIG. 1F). An external microphone array 164 (FIG. 1F) is operatively coupled to a passing vehicle 122 (FIG. 1F) that receives an external atypical transport audio of the transport, an external audio beamformer 198 (FIG. 1F) is operatively coupled to the passing vehicle 122 (FIG. 1F) that estimates an external source location of the external atypical transport audio of the transport 110 (FIG. 1F) and a transceiver 124 (FIG. 1F) is operatively coupled to the transport 110 (FIG. 1F) that receives the external atypical transport audio and the external source location from the passing vehicle 122 (FIG. 1F). A processor is operatively coupled to the transport 110 (FIG. 1F) that determines a set of potential causes of the atypical transport audio 166 (FIG. 1F) and sends the set of potential causes of the atypical transport audio 166 (FIG. 1F) to a server 118 (FIG. 1F).

The system may also execute a blockchain transaction related storing the atypical transport audio, the possible source location and the set of potential causes of the atypical transport audio to a ledger of the blockchain and execute a blockchain transaction related to a smart contract to address the set of potential causes of atypical transport audio on the ledger of the blockchain.

Figure 2A:
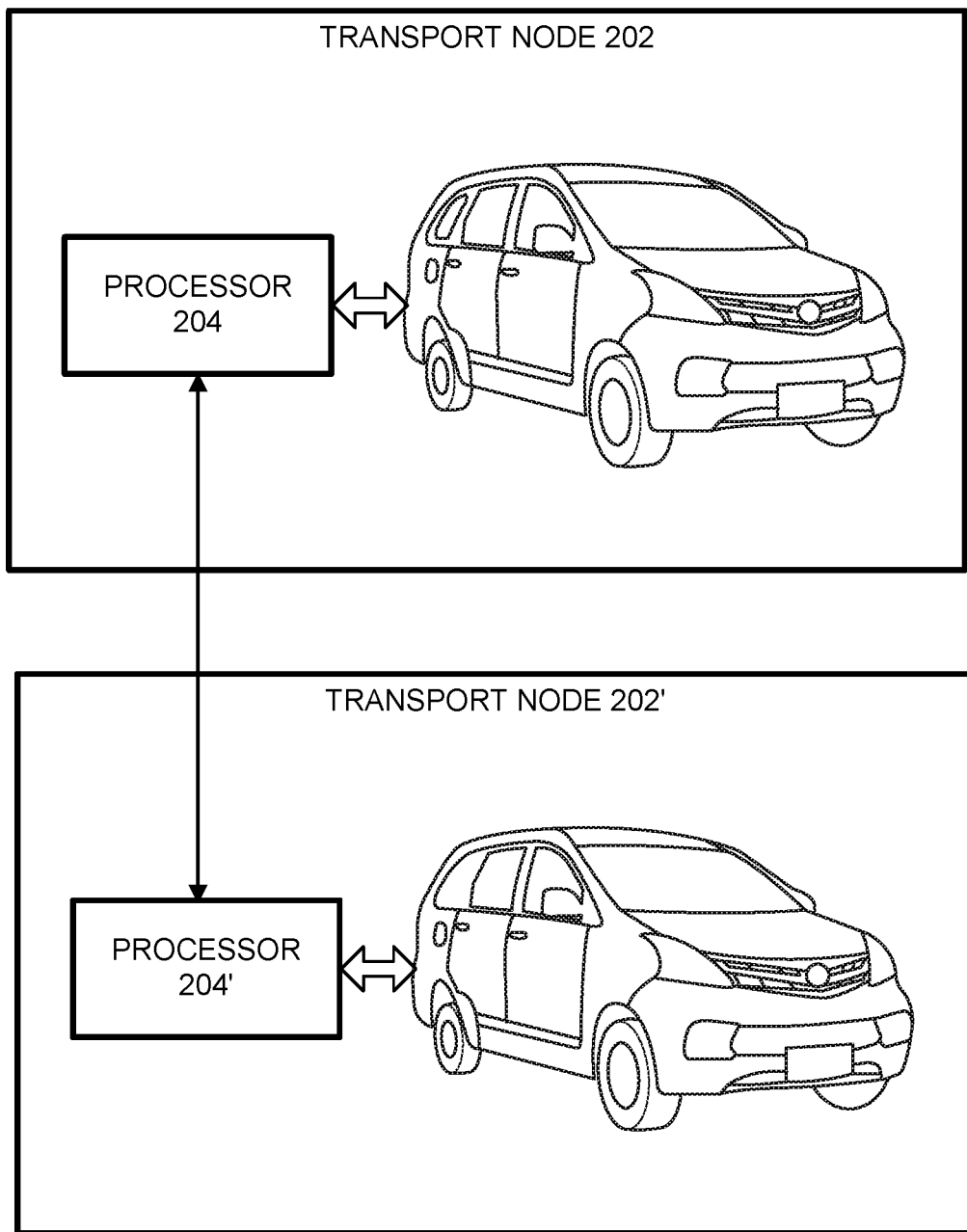
FIG. 2A illustrates a transport network diagram, according to example embodiments.

FIG. 2A illustrates a transport network diagram 200, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 2B:
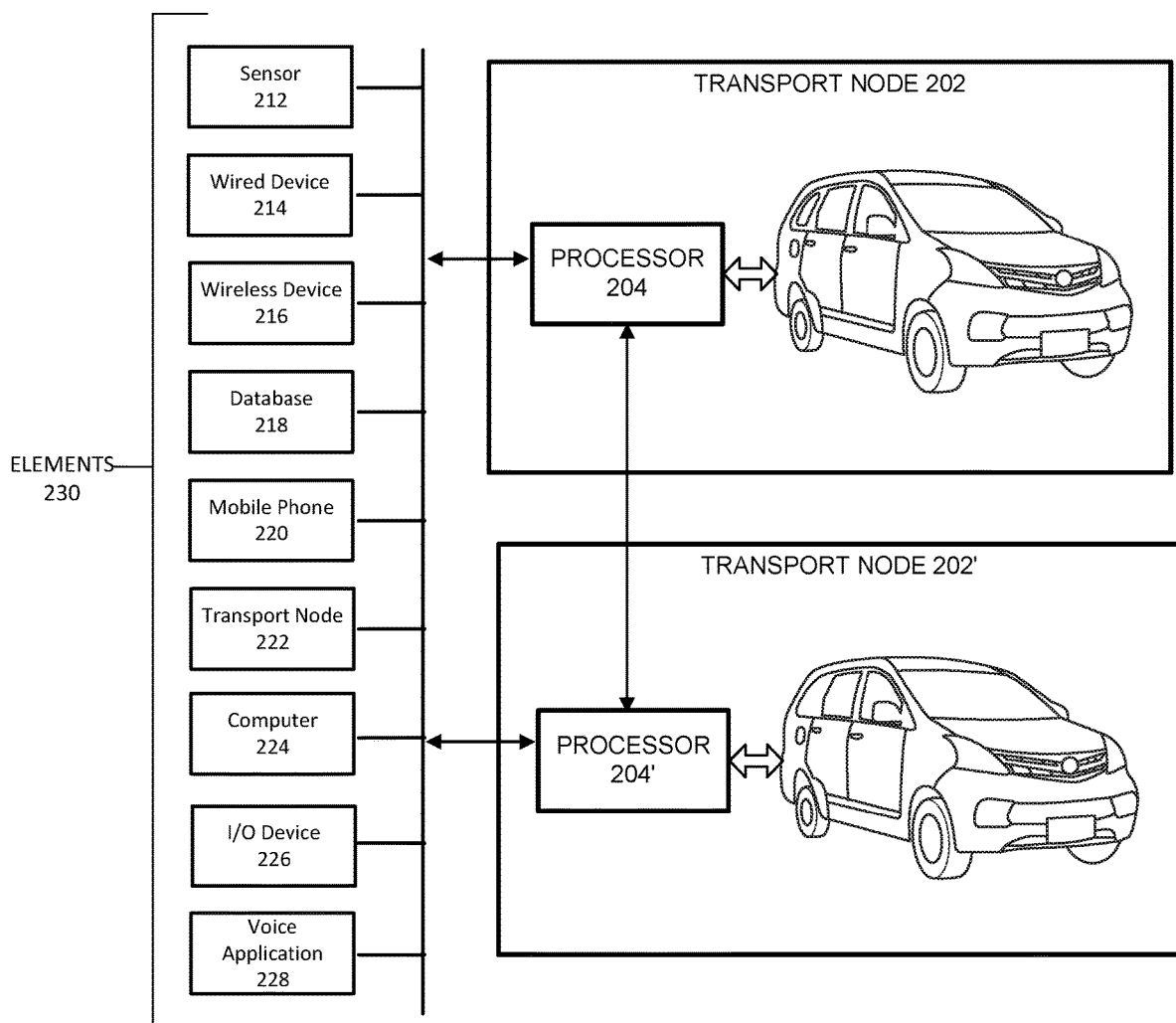
FIG. 2B illustrates another transport network diagram, according to example embodiments.

FIG. 2B illustrates another transport network diagram 210, according to example embodiments. The network comprises elements including a transport node 202 including a processor 204, as well as a transport node 202' including a processor 204'. The transport nodes 202, 202' communicate with one another via the processors 204, 204', as well as other elements (not shown) including transceivers, transmitters, receivers, storage, sensors and other elements capable of providing communication. The communication between the transport nodes 202, 202' can occur directly, via a private and/or a public network (not shown) or via other transport nodes and elements comprising one or more of a processor, memory, and software. The processors 204, 204' can further communicate with one or more elements 230 including sensor 212, wired device 214, wireless device 216, database 218, mobile phone 220, transport node 222, computer 224, I/O device 226 and voice application 228. The processors 204, 204' can further communicate with elements comprising one or more of a processor, memory, and software.

Although depicted as single transport nodes, processors and elements, a plurality of transport nodes, processors and elements may be present. Information or communication can occur to and/or from any of the processors 204, 204' and elements 230. For example, the mobile phone 220 may provide information to the processor 204 which may initiate the transport node 202 to take an action, may further provide the information or additional information to the processor 204' which may initiate the transport node 202' to take an action, may further provide the information or additional information to the mobile phone 220, the transport node 222, and/or the computer 224. One or more of the applications, features, steps, solutions, etc., described and/or depicted herein may be utilized and/or provided by the instant elements.

Figure 2C:
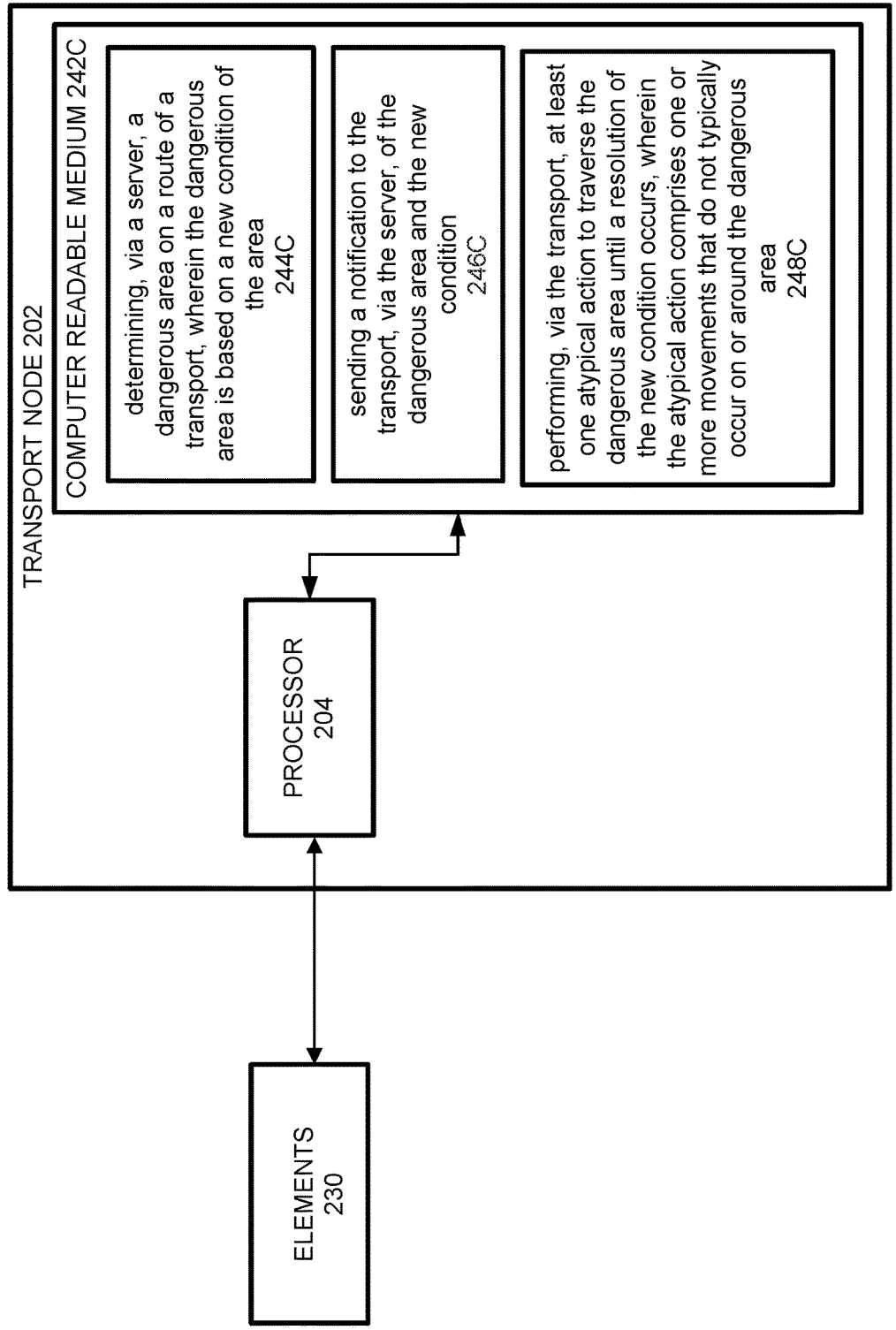
FIG. 2C illustrates yet another transport network diagram, according to example embodiments.

FIG. 2C illustrates yet another transport network diagram 240, according to example embodiments. The network comprises elements including a transport node 202 including a processor 204 and a non-transitory computer readable medium 242C. The processor 204 is communicably coupled to the non-transitory computer readable medium 242C and elements 230 (which were depicted in FIG. 2B).

The processor 204 performs one or more of determining 244C, via a server, a dangerous area on a route of a transport, wherein the dangerous area is based on a new condition of an area, sending 246C a notification to the transport, via the server, of the dangerous area and the new condition and performing 248C, via the transport, at least one atypical action to traverse the dangerous area until a resolution of the new condition occurs, wherein the atypical action comprises one or more movements that do not typically occur on or around the dangerous area.

The driving data from the preceding vehicle and the transport is sent to a server where the driving data is stored in a blockchain. The vehicle may be monitored via one or more sensors that report sensed data to a central controller computer device, which in turn, is forwarded to a blockchain and/or a management server for review and action. Additionally, the blockchain may be in a server outside of the transport or the preceding vehicle, or, each of the transports/vehicles may be a node in the blockchain, that are connected in a blockchain network.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 2D:
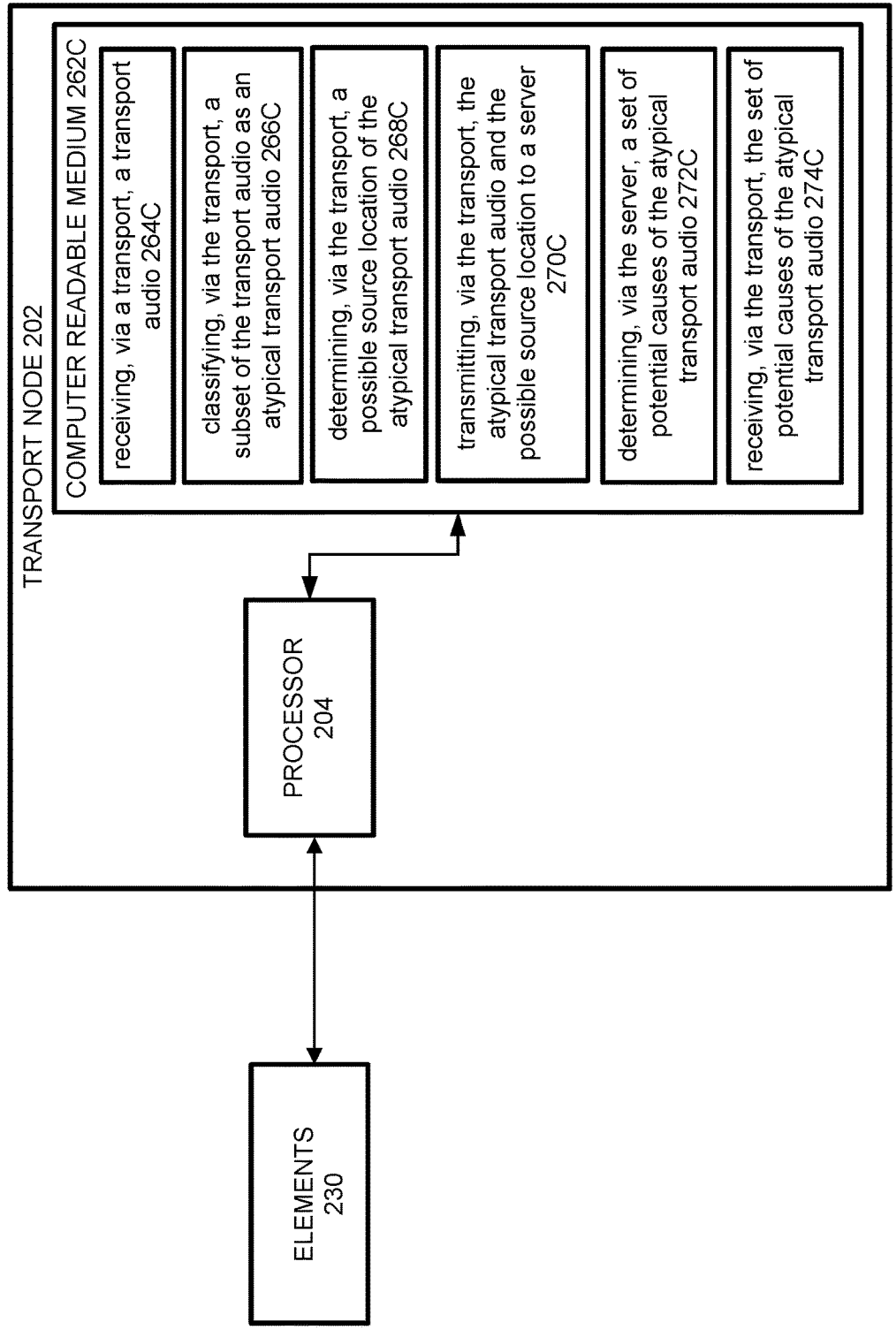
FIG. 2D illustrates another transport network diagram, according to example embodiments.

FIG. 2D illustrates another transport network diagram 260, according to example embodiments. The network comprises elements including a transport node 202 including a processor 204 and a non-transitory computer readable medium 262C. The processor 204 is communicably coupled to the non-transitory computer readable medium 262C and elements 230 (which were depicted in FIG. 2B).

The processor 204 performs one or more of receiving 264C, via a transport, a transport audio, classifying 266C, via the transport, a subset of the transport audio as an atypical transport audio, determining 268C, via the transport, a possible source location of the atypical transport audio, transmitting 270C, via the transport, the atypical transport audio and the possible source location to a server, determining 272C, via the server, a set of potential causes of the atypical transport audio and receiving 274C, via the transport, the set of potential causes of the atypical transport audio.

In a second embodiment in which the processor performs self-audio identification and self-diagnosis comprising one or more of receiving, via a transport, a transport audio, classifying, via the transport, a subset of the transport audio as an atypical transport audio, determining, via the transport, a possible source location of the atypical transport audio, determining, via the transport, a set of potential causes of the atypical transport audio and transmitting, via the transport to a server, the set of potential causes of the atypical transport audio.

In a third embodiment in which the processor performs self and external audio identification and server diagnosis comprising one or more of receiving, via a transport, a transport audio, classifying, via the transport, a subset of the transport audio as an atypical transport audio, determining, via the transport, a possible source location of the atypical transport audio, receiving, via a passing vehicle, an external atypical transport audio of the transport, determining, via the passing vehicle, a possible external source location of the external atypical transport audio of the transport, transmitting, via the transport, the atypical transport audio and the possible source location to a server, transmitting, via the passing vehicle, the external atypical transport audio and the possible external source location to a server, determining, via the server, a set of potential causes of the atypical transport audio and receiving, via the transport, the set of potential causes of the atypical transport audio.

In a fourth embodiment in which the processor performs self and external audio identification and self-diagnosis comprising one or more of receiving, via a transport, a transport audio, classifying, via the transport, a subset of the transport audio as an atypical transport audio, determining, via the transport, a possible source location of the atypical transport audio, receiving, via a passing vehicle, an external atypical transport audio of the transport, determining, via the passing vehicle, a possible external source location of the external atypical transport audio of the transport, transmitting, via the transport, the atypical transport audio and the possible source location to a server, transmitting, via the passing vehicle, the external atypical transport audio and the possible external source location to a server and determining, via the transport, a set of potential causes of the atypical transport audio.

The processor may also perform executing a blockchain transaction related storing the atypical transport audio, the possible source location and the set of potential causes of the atypical transport audio to a ledger of the blockchain and executing a blockchain transaction related to a smart contract to address the set of potential causes of atypical transport audio on the ledger of the blockchain.

Figure 3A:
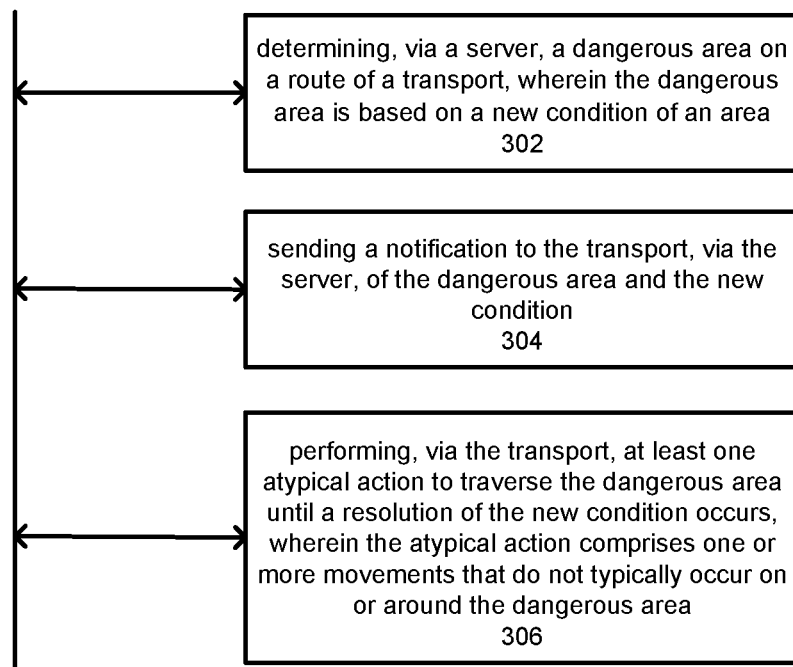
FIG. 3A illustrates a first flow diagram, according to example embodiments.

FIG. 3A illustrates a flow diagram 300, according to example embodiments. Referring to FIG. 3A, the flow comprises determining 302, via a server, a dangerous area on a route of a transport, wherein the dangerous area is based on a new condition of an area, sending 304 a notification to the transport, via the server, of the dangerous area and the new condition and performing 306, via the transport, at least one atypical action to traverse the dangerous area until a resolution of the new condition occurs, wherein the atypical action comprises one or more movements that do not typically occur on or around the dangerous area.

In other embodiments, the transport may transmit information regarding the dangerous area. The new condition may be detected by one or more preceding vehicles traveling through the dangerous area that transmit information related to the new condition to the server. The notification may be provided via at least one of an audible signal to a driver, a visual signal to the driver and an electrical signal to the transport. The resolution may be based on a non-detection of the new condition by one or more current vehicles traveling through the dangerous area, wherein the one or more current vehicles transmit information related to the non-detection of the new condition to the server and/or an elapsed time from a beginning of the new condition.

In some examples the dangerous area may be determined by at least one of a statistically accident prone area, an erratic movement of a preceding vehicle, a sensed object by the preceding vehicle and a statistically unusual traffic pattern.

The new condition may be detected by a preceding vehicle, may be based on a movement of a preceding vehicle and the duration of the new condition may be based on at least one of a time delta based on historical data from a beginning of the new condition.

In one example with the vehicle driving into the setting sun, glare would be reduced past the point of a horizon, or if the sun were rising, the sun would provide glare. In cases where the vehicle is autonomous, the effect of a rising or setting sun would be minimal compared to the visual effect it would have on a driver-assisted vehicle. In this instance with an autonomous vehicle the atypical response would be to have increased awareness of the movement of other vehicles, in the case where a driver is in control, a warning to slow down would be sent.

The driving data from the preceding vehicle and the transport is sent to a server where the driving data is stored in a blockchain. The vehicle may be monitored via one or more sensors that report sensed data to a central controller computer device, which in turn, is forwarded to a blockchain and/or a management server for review and action. Additionally, the blockchain may be in a server outside of the transport or the preceding vehicle, or, each of the transports/vehicles may be a node in the blockchain, that are connected in a blockchain network.

Figure 3B:
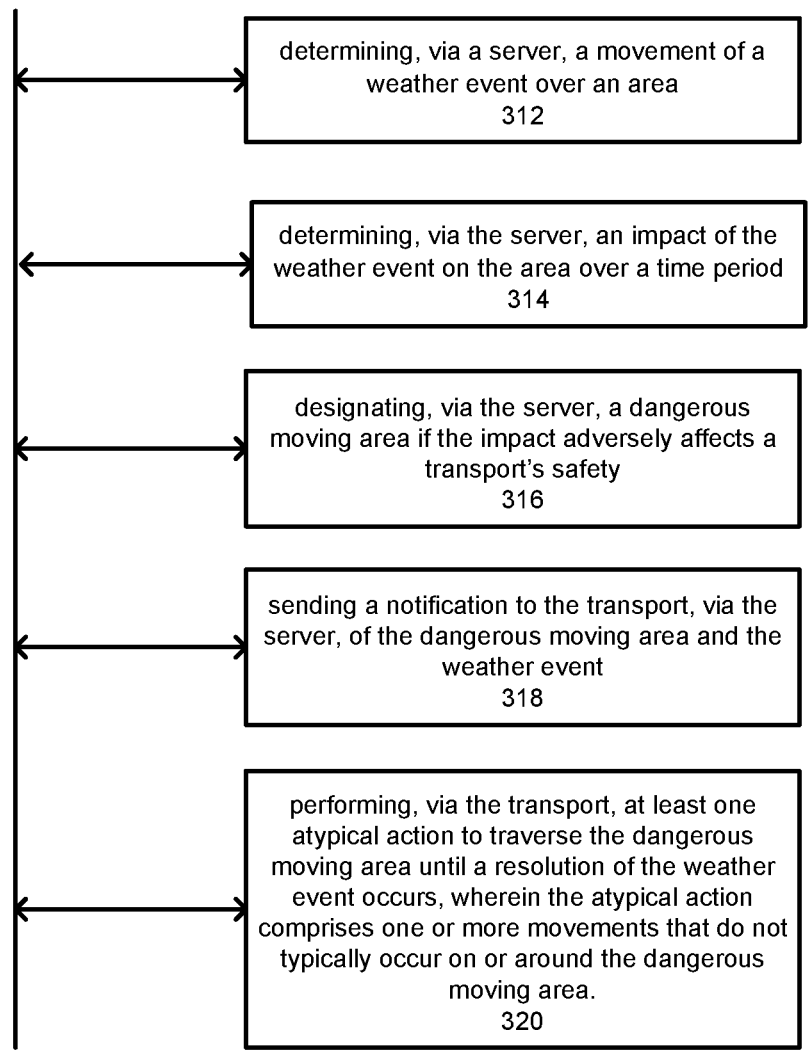
FIG. 3B illustrates a second flow diagram, according to example embodiments.

FIG. 3B illustrates a flow diagram 310, according to example embodiments. Referring to FIG. 3B, the flow comprises determining 312, via a server, a movement of a weather event over an area, determining 314, via the server, an impact of the weather event on the area over a time period, designating 316, via the server, a dangerous moving area if the impact adversely affects a transport's safety, sending 318 a notification to the transport, via the server, of the dangerous moving area and the weather event and performing 320, via the transport, at least one atypical action to traverse the dangerous moving area until a resolution of the weather event occurs, wherein the atypical action comprises one or more movements that do not typically occur on or around the dangerous moving area.

The moving dangerous area is depicted in FIG. 1E where a rainstorm crosses the route. The movement of the rainstorm and the integrated effect of the rainfall leads to accumulated effects such as localized flooding, resulting in possible hydroplaning that dissipate over time after the rainstorm has left the route.

The example method may also include a historical safety impact of the new weather condition on an area of the route, a historical incoming time delay of the new weather condition to an initiation of a dangerous area alert, a historical outgoing time delay of the new weather condition to a cessation of a dangerous area alert, a historical action response to traverse the dangerous area, a probable duration of the new weather condition on an area of the route and an approach response of at least one approaching transport to minimize transport delays on the route of the transport.

The new weather condition may be based on a detected weather condition via the server and/or detected by the preceding vehicle. The new condition may be detected by the preceding vehicle based on at least one of a swerve of the preceding vehicle, an erratic action of the preceding vehicle and a sudden braking of the preceding vehicle.

Figure 3C:
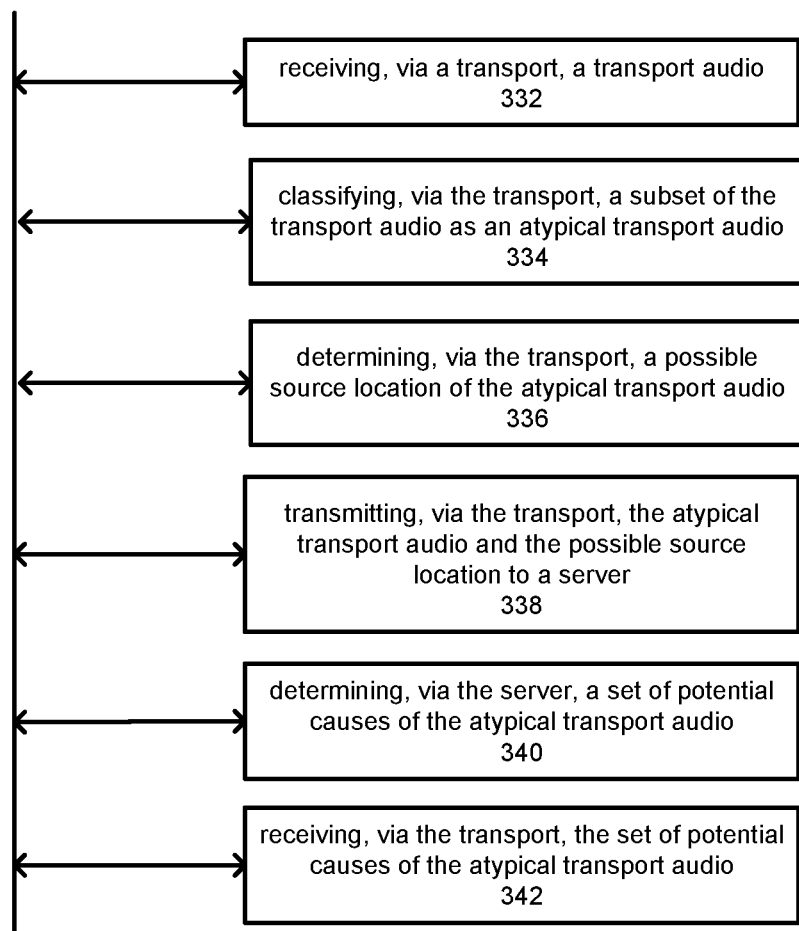
FIG. 3C illustrates a third flow diagram, according to example embodiments.

FIG. 3C illustrates a flow diagram 330, according to example embodiments. Referring to FIG. 3C, the flow comprises one or more of receiving 332, via a transport, a transport audio, classifying 334, via the transport, a subset of the transport audio as an atypical transport audio, determining 336, via the transport, a possible source location of the atypical transport audio, transmitting 338, via the transport, the atypical transport audio and the possible source location to a server, determining 340, via the server, a set of potential causes of the atypical transport audio and receiving 342, via the transport, the set of potential causes of the atypical transport audio.

In a second embodiment in which the flow performs self audio identification and self diagnosis comprising one or more of receiving, via a transport, a transport audio, classifying, via the transport, a subset of the transport audio as an atypical transport audio, determining, via the transport, a possible source location of the atypical transport audio, determining, via the transport, a set of potential causes of the atypical transport audio and transmitting, via the transport to a server, the set of potential causes of the atypical transport audio.

In a third embodiment in which the flow performs self and external audio identification and server diagnosis comprising one or more of receiving, via a transport, a transport audio, classifying, via the transport, a subset of the transport audio as an atypical transport audio, determining, via the transport, a possible source location of the atypical transport audio, receiving, via a passing vehicle, an external atypical transport audio of the transport, determining, via the passing vehicle, a possible external source location of the external atypical transport audio of the transport, transmitting, via the transport, the atypical transport audio and the possible source location to a server, transmitting, via the passing vehicle, the external atypical transport audio and the possible external source location to a server, determining, via the server, a set of potential causes of the atypical transport audio and receiving, via the transport, the set of potential causes of the atypical transport audio.

In a fourth embodiment in which the flow performs self and external audio identification and self-diagnosis comprising one or more of receiving, via a transport, a transport audio, classifying, via the transport, a subset of the transport audio as an atypical transport audio, determining, via the transport, a possible source location of the atypical transport audio, receiving, via a passing vehicle, an external atypical transport audio of the transport, determining, via the passing vehicle, a possible external source location of the external atypical transport audio of the transport, transmitting, via the transport, the atypical transport audio and the possible source location to a server, transmitting, via the passing vehicle, the external atypical transport audio and the possible external source location to a server and determining, via the transport, a set of potential causes of the atypical transport audio.

The flow diagram 330 of FIG. 3C may also include determining, via the server, a set of possible danger levels of the set of potential causes of the atypical transport audio, recording, via the server, the atypical transport audio and potential causes for subsequent repairs and receiving, via a passing vehicle, an external vehicle atypical audio. The flow diagram 330 may further include classifying, via the server, the external vehicle atypical audio and determining, via the server, an external vehicle source location of the external vehicle atypical audio. The flow diagram 330 may also comprise executing a blockchain transaction related storing the atypical transport audio, the possible source location and the set of potential causes of the atypical transport audio to a ledger of the blockchain and executing a blockchain transaction related to a smart contract to address the set of potential causes of atypical transport audio on the ledger of the blockchain.

Figure 4:
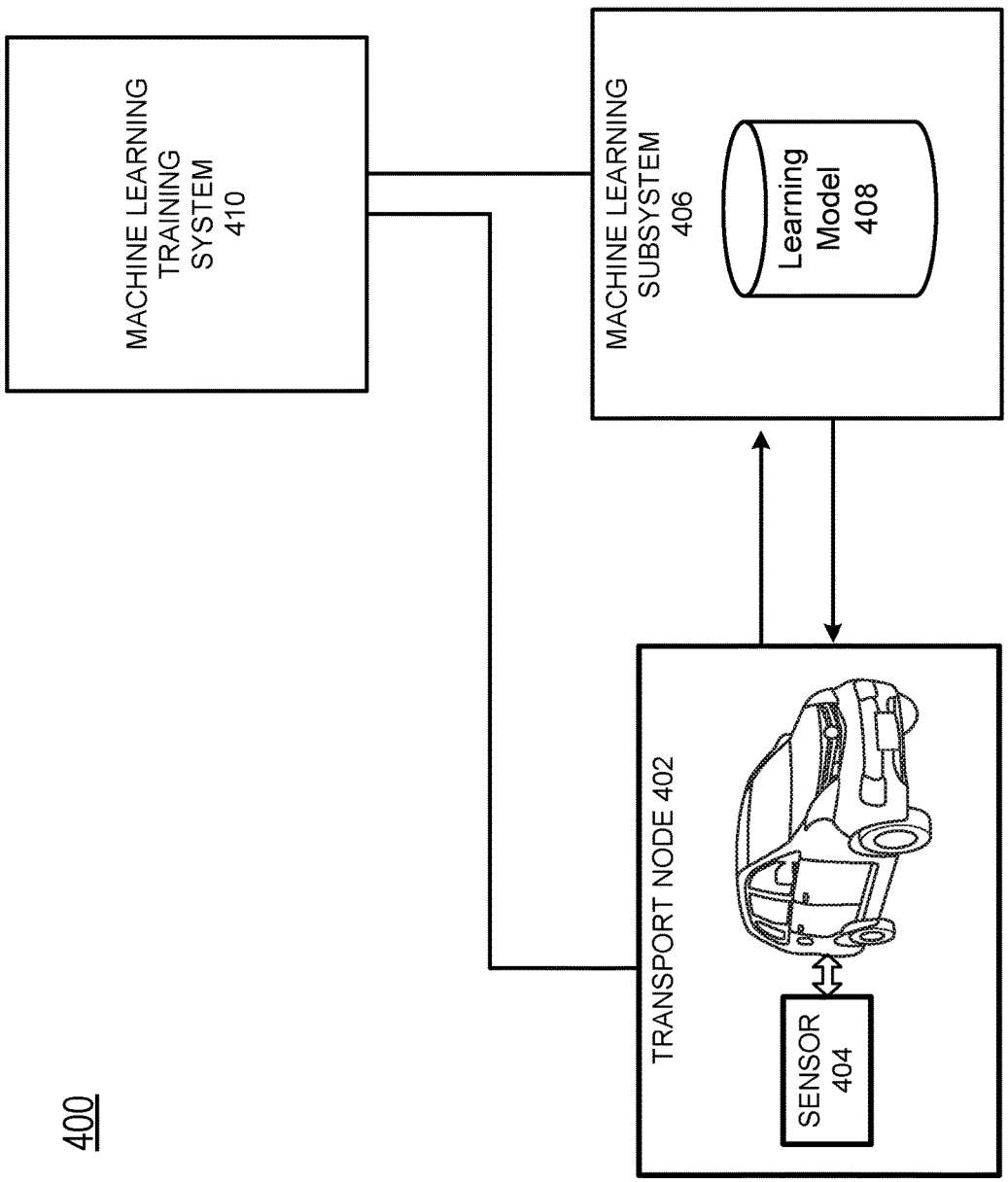
FIG. 4 illustrates a machine learning transport network diagram, according to example embodiments.

FIG. 4 illustrates a machine learning transport network diagram 400, according to example embodiments. The network 400 includes a transport node 402 that interfaces with a machine learning subsystem 406. The transport node includes one or more sensors 404.

The machine learning subsystem 406 contains a learning model 408 which is a mathematical artifact created by a machine learning training system 410 that generates predictions by finding patterns in one or more training data sets. In some embodiments, the machine learning subsystem 406 resides in the transport node 402. In other embodiments, the machine learning subsystem 406 resides outside of the transport node 402.

The transport node 402 sends data from the one or more sensors 404 to the machine learning subsystem 406. The machine learning subsystem 406 provides the one or more sensor 404 data to the learning model 408 which returns one or more predictions. The machine learning subsystem 406 sends one or more instructions to the transport node 402 based on the predictions from the learning model 408.

In a further embodiment, the transport node 402 may send the one or more sensor 404 data to the machine learning training system 410. In yet another embodiment, the machine learning subsystem 406 may sent the sensor 404 data to the machine learning subsystem 410. One or more of the applications, features, steps, solutions, etc., described and/or depicted herein may utilize the machine learning network 400 as described herein.

Figure 5A:
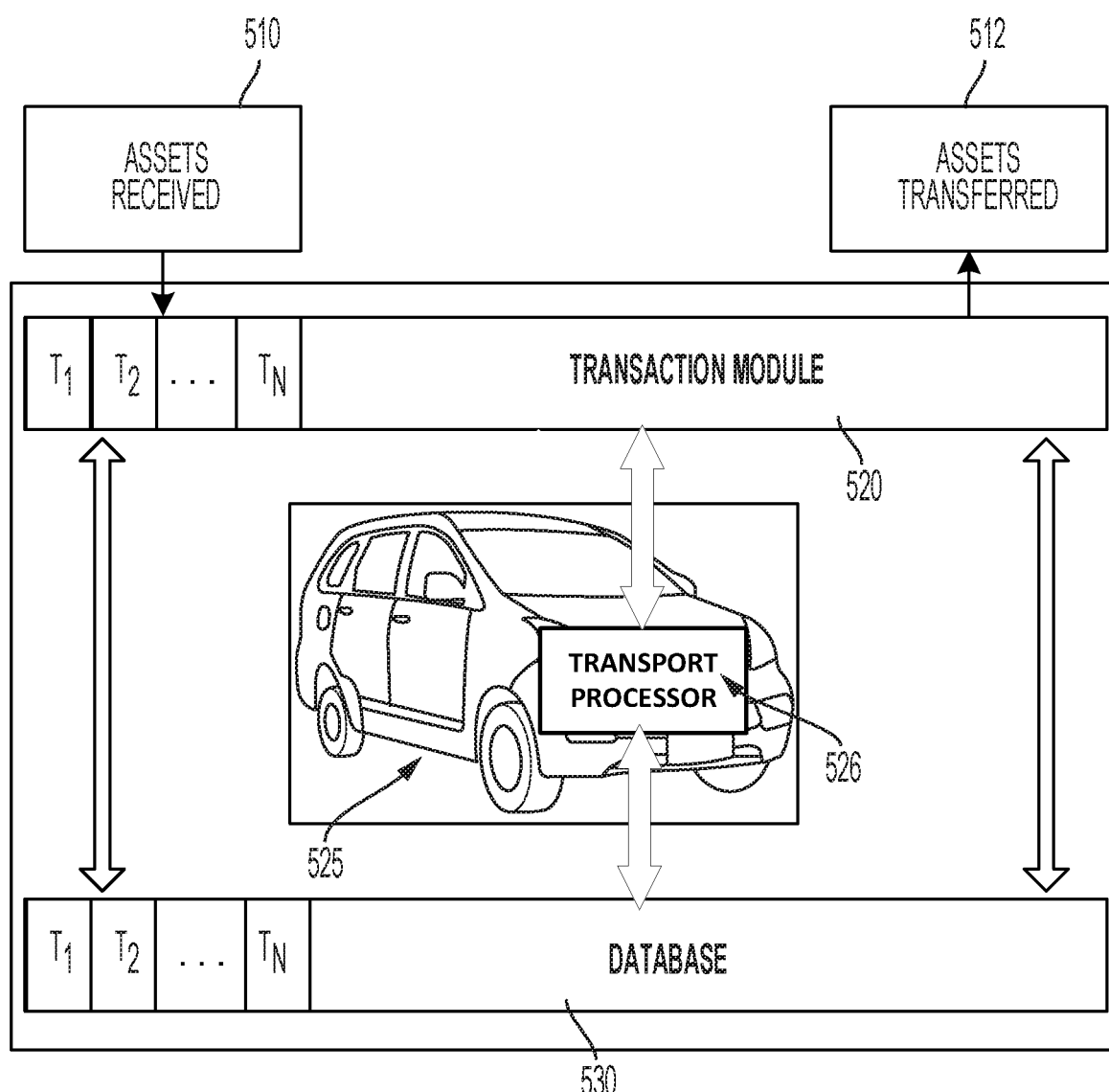
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 5B:
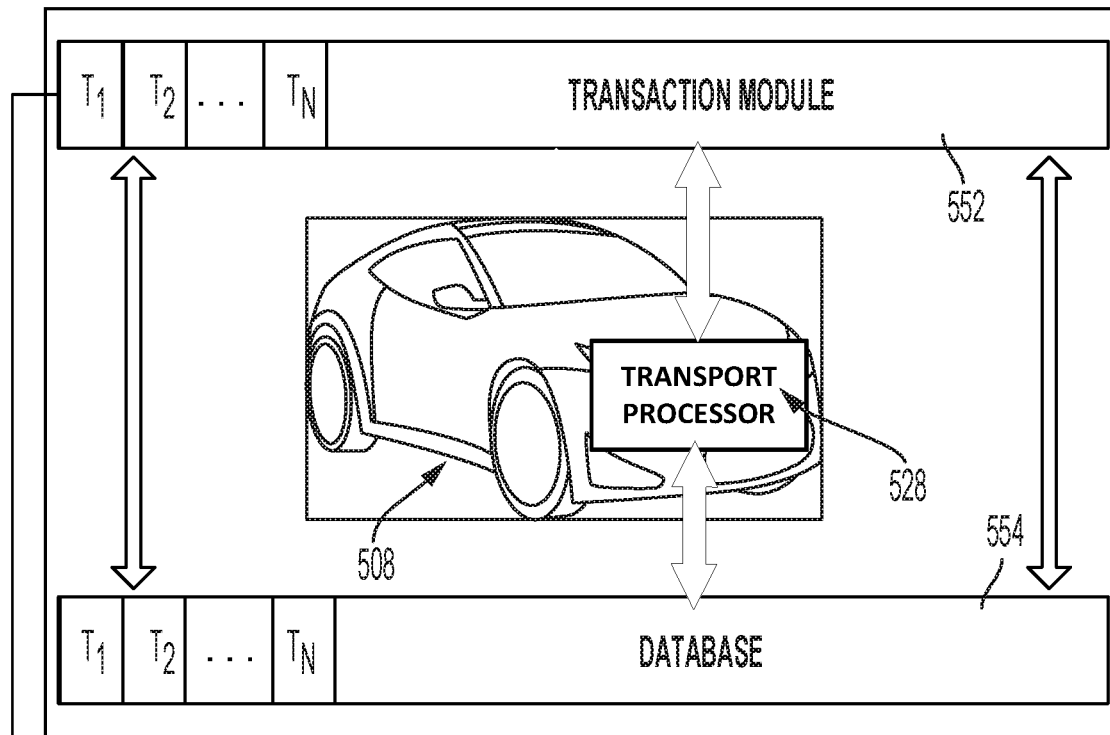
FIG. 5B illustrates another example vehicle configuration for managing database transactions conducted among various vehicles, according to example embodiments
Figure 5B:
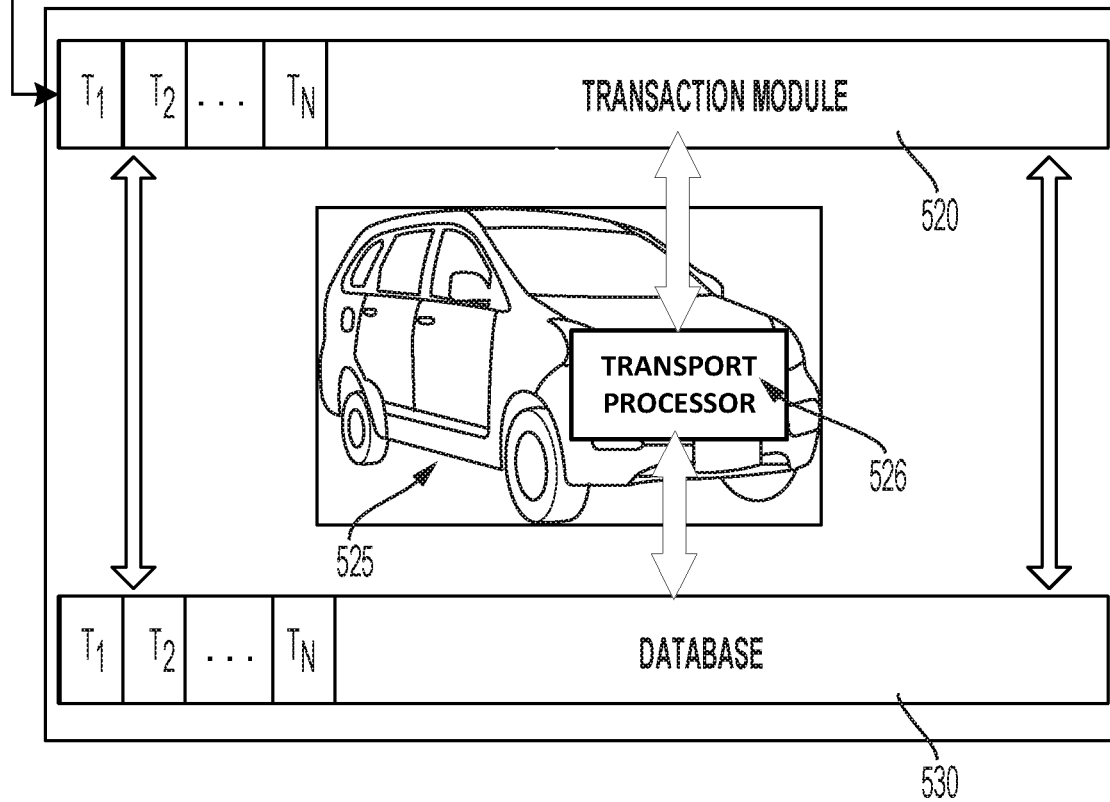

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, a transport processor 528 and the transaction module 552. The vehicle 508 may notify another vehicle 525 which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or, are logged in the same blockchain used by all members. The database 554 can be one of a SQL database, an RDBMS, a relational database, a non-relational database, a blockchain, a distributed ledger, and may be on board the transport, may be off board the transport, may be accessible directly and/or through a network.

Figure 6A:
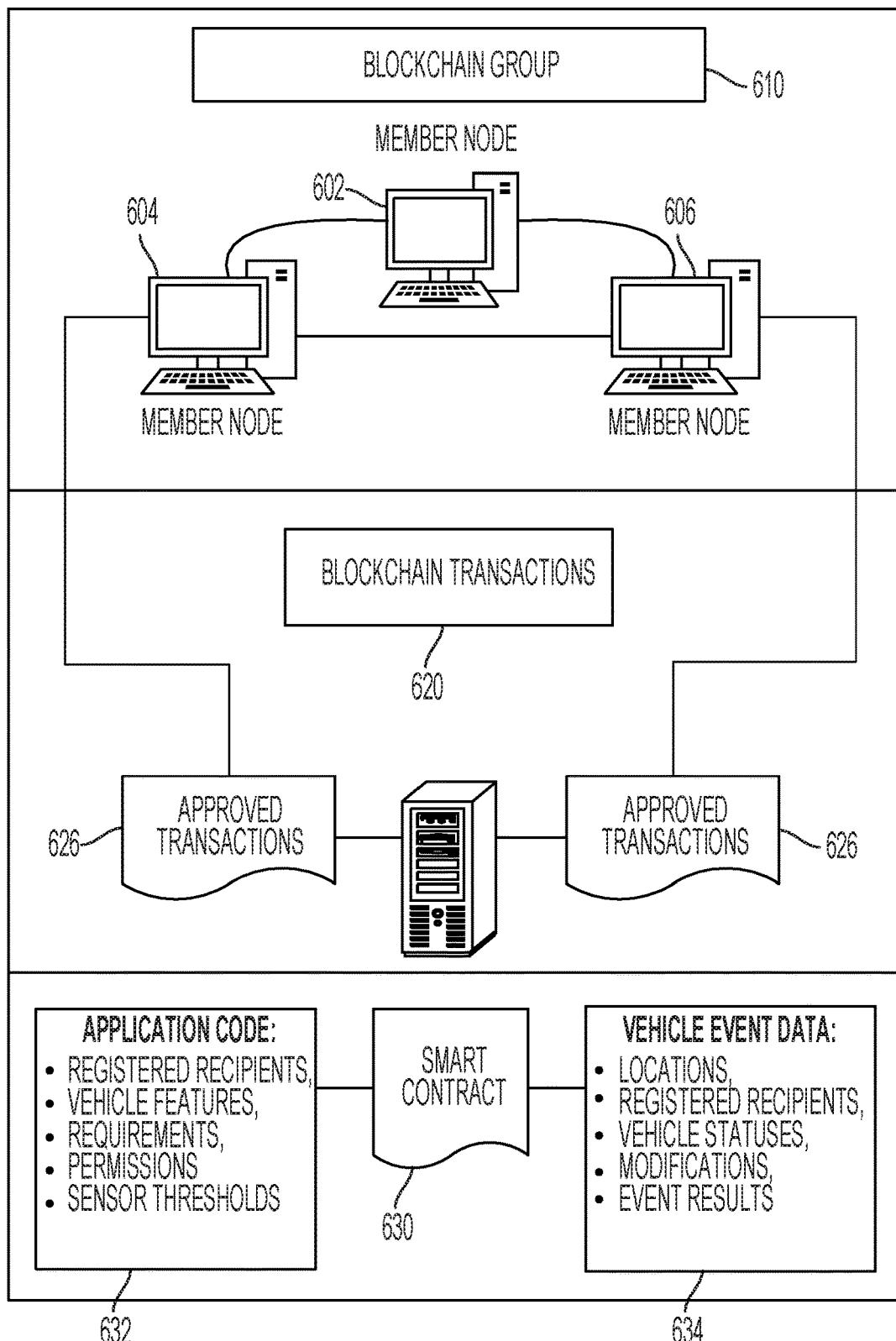
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
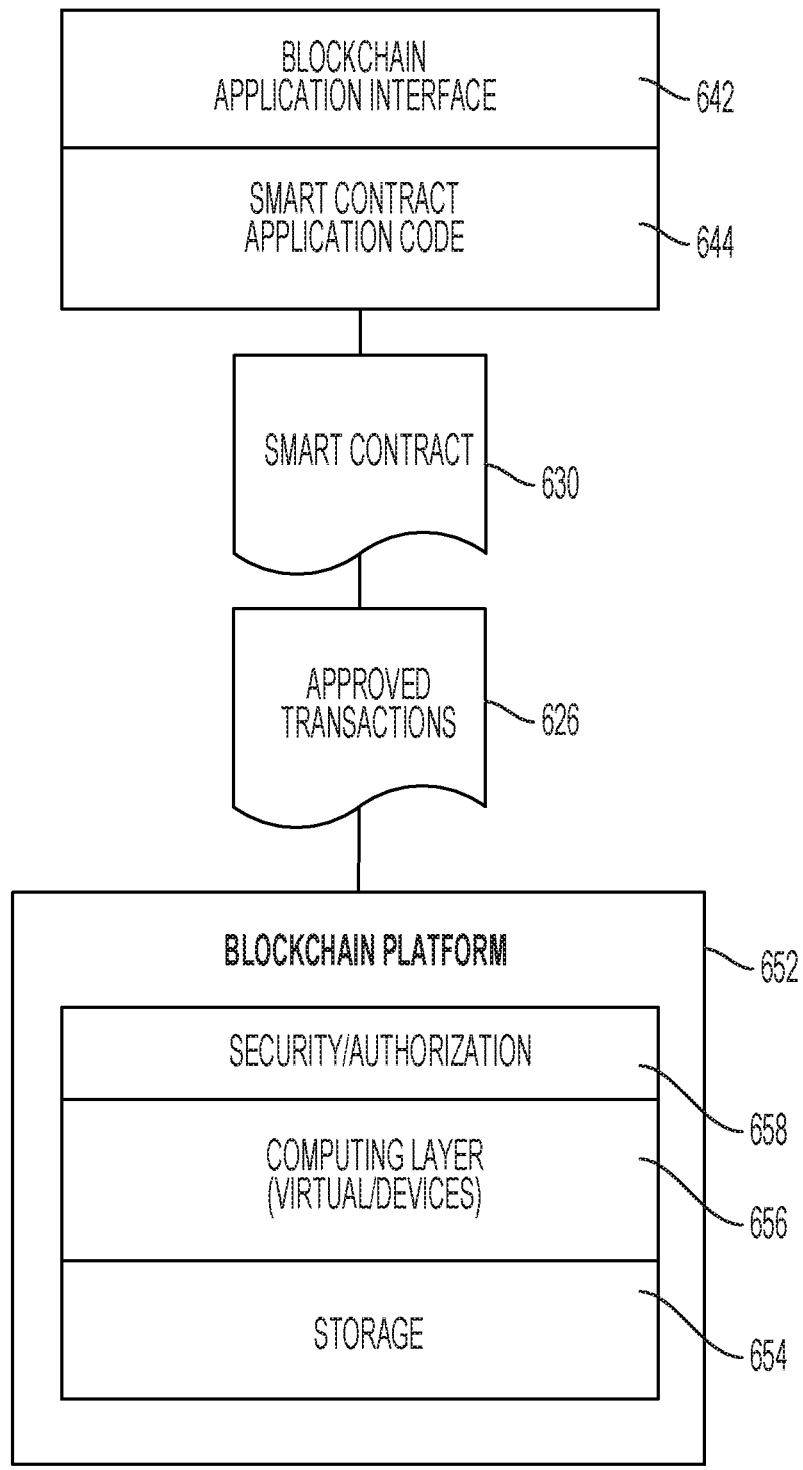
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an application programming interface or plug-in application that links to the computing device and execution platform for a particular transaction. The blockchain configuration 640 may include one or more applications which are linked to application programming interfaces (APIs) to access and execute stored program/application code (e.g., smart contract executable code, smart contracts, etc.) which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code which when executed causes the transaction terms and conditions to become active. The smart contract 630, when executed, causes certain approved transactions 626 to be generated, which are then forwarded to the blockchain platform 652. The platform includes a security/authorization 658, computing devices which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
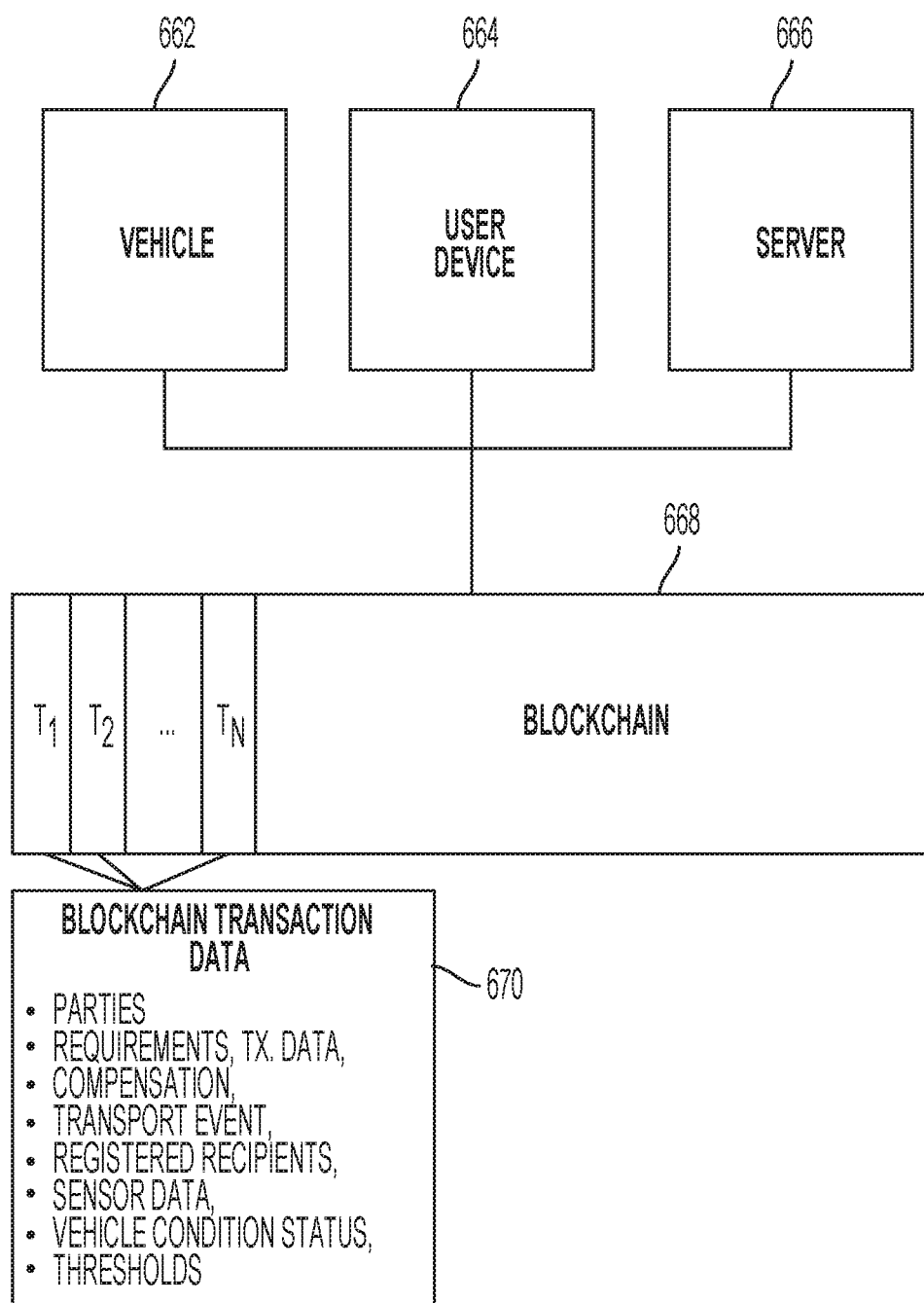
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
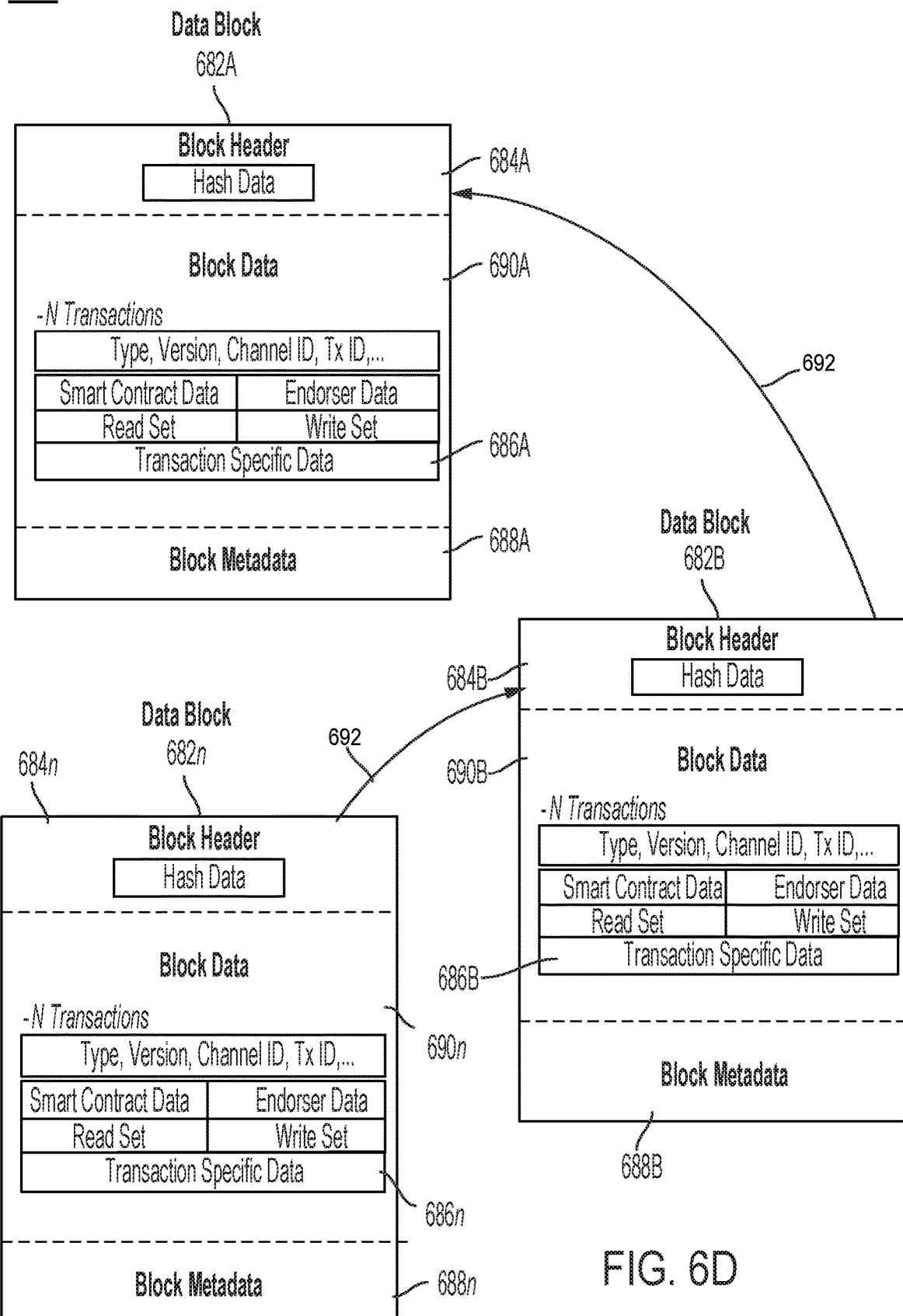
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts which simulate the entry proposals. When an endorsing node endorses an entry, the endorsing nodes creates an entry endorsement which is a signed response from the endorsing node to the client application indicating the endorsement of the simulated entry. The method of endorsing an entry depends on an endorsement policy which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction specific data 686A which stores entry data; however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction specific data 686A which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
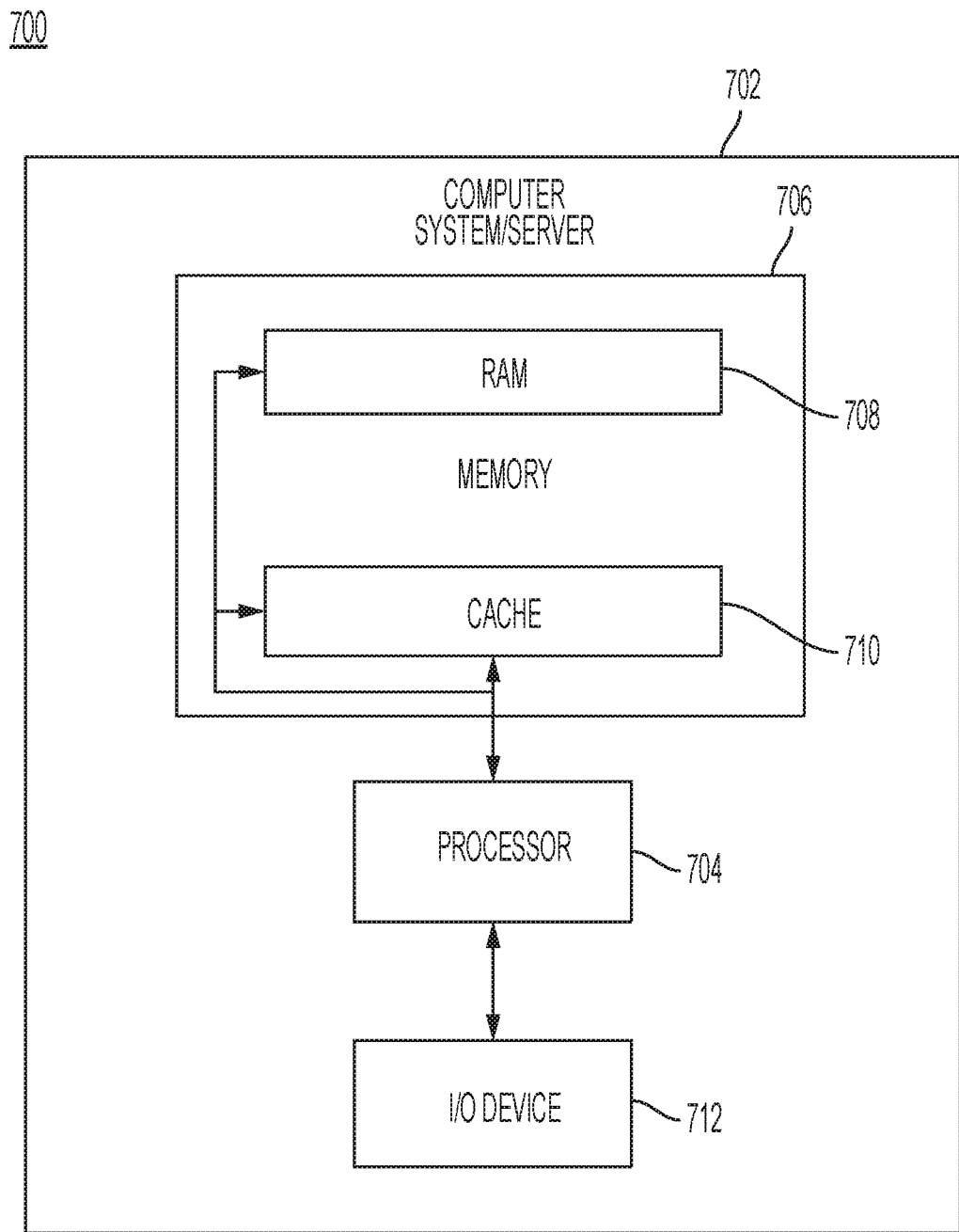
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    receiving, via a transport, a transport audio from another transport as the another transport is passing the transport, wherein the transport audio is received at a microphone array of the transport;
    classifying, via the transport, a subset of the transport audio as an atypical transport audio, wherein the classifying is performed by a transport audio classifier discriminating the atypical transport audio from typical transport audio;
    determining, via the transport, an estimated source location of the atypical transport audio based on an audio beamformer coupled to the transport;
    determining, via the transport, a set of potential causes of the atypical transport audio;
    transmitting, via the transport, the atypical transport audio, the possible source location and the set of potential causes to a server; and
    determining, via the server, a set of possible danger levels of the set of potential causes of the atypical transport audio.

2. The method of claim 1, comprising, recording, via the server, the atypical transport audio and potential causes for subsequent repairs.

3. The method of claim 1, comprising, executing a blockchain transaction storing the atypical transport audio, the possible source location and the set of potential causes of the atypical transport audio to a ledger of a blockchain.

4. The method of claim 1, comprising, executing a blockchain transaction related to a smart contract to address the set of potential causes of atypical transport audio on a ledger of a blockchain.

5. A system, comprising:
    a microphone array operatively coupled to a transport that receives a transport audio from another transport as the another transport is passing the transport;
    an audio classifier operatively coupled to the transport that discriminates atypical transport audio from typical transport audio;
    an audio beamformer operatively coupled to the transport that estimates an estimated source location of the atypical transport audio;
    a processor operatively coupled to the transport to determine a set of potential causes of the atypical transport audio;
    a transceiver operatively coupled to the transport that transmits the atypical transport audio, the possible source location and the set of potential causes to a server; and
    a server that determines a set of possible danger levels of the set of potential causes of the atypical transport audio.

6. The system of claim 5, wherein the server records the atypical transport audio and potential causes for subsequent repairs.

7. A non-transitory computer readable medium comprising instructions, that when read by a processor, cause the processor to perform:
    receiving, via a transport, a transport audio from another transport as the another transport is passing the transport, wherein the transport audio is received at a microphone array of the transport;
    classifying, via the transport, a subset of the transport audio as an atypical transport audio, wherein the classifying is performed by a transport audio classifier discriminating the atypical transport audio from typical transport audio;
    determining, via the transport, an estimated source location of the atypical transport audio based on an audio beamformer coupled to the transport;
    determining, via the transport, a set of potential causes of the atypical transport audio; and
    transmitting, via the transport, the atypical transport audio, the possible source location and the set of potential causes to a server; and
    determining, via the server, a set of possible danger levels of the set of potential causes of the atypical transport audio.

8. The non-transitory computer readable medium of claim 7, comprising, recording, via the server, the atypical transport audio and potential causes for subsequent repairs.

* * * * *